United States Patent
Yoshida et al.

(10) Patent No.: US 9,122,355 B2
(45) Date of Patent: Sep. 1, 2015

(54) INDICATION MEMBER, OPTICAL POSITION DETECTION DEVICE, AND DISPLAY SYSTEM WITH INPUT FUNCTION

(75) Inventors: Kazuki Yoshida, Suwa (JP); Kanechika Kiyose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 502 days.

(21) Appl. No.: 13/538,579

(22) Filed: Jun. 29, 2012

(65) Prior Publication Data

US 2013/0002536 A1    Jan. 3, 2013

(30) Foreign Application Priority Data

Jun. 30, 2011    (JP) .................................. 2011-145371

(51) Int. Cl.
G06F 3/03 (2006.01)
G06F 3/042 (2006.01)
G06F 3/0354 (2013.01)

(52) U.S. Cl.
CPC .......... *G06F 3/0428* (2013.01); *G06F 3/03545* (2013.01)

(58) Field of Classification Search
USPC .................................. 345/156–158
See application file for complete search history.

(56) References Cited

U.S. PATENT DOCUMENTS

| 5,792,006 A * | 8/1998 | Hesser ........................... 473/239 |
| 6,953,926 B2 | 10/2005 | Reime |
| 2006/0238499 A1 * | 10/2006 | Wenstrand .................... 345/156 |
| 2008/0261693 A1 * | 10/2008 | Zalewski ......................... 463/31 |
| 2010/0188330 A1 * | 7/2010 | Ueshima ....................... 345/156 |
| 2011/0299729 A1 * | 12/2011 | Dawe et al. ................... 382/103 |

FOREIGN PATENT DOCUMENTS

| JP | 57-211637 A | 12/1982 |
| JP | 2003-534554 | 11/2003 |
| JP | 2006-350908 A | 12/2006 |
| JP | 2009-295318 | 12/2009 |
| JP | 2010-127671 | 6/2010 |
| JP | 2011-014107 | 1/2011 |
| JP | 2011-122871 A | 6/2011 |

* cited by examiner

*Primary Examiner* — Robin Mishler
(74) *Attorney, Agent, or Firm* — Harness, Dickey & Pierce, P.L.C.

(57) ABSTRACT

A detectable indication member for an optical position detection device includes a round bar shaped shaft and a spherical body provided at the distal end of the shaft. The outer peripheral surface of the spherical body and the outer peripheral surface of an end portion of the shaft portion connected to the spherical body form a retroreflective portion. A portion of the shaft adjacent the base end of the end portion absorbs infrared light.

22 Claims, 20 Drawing Sheets

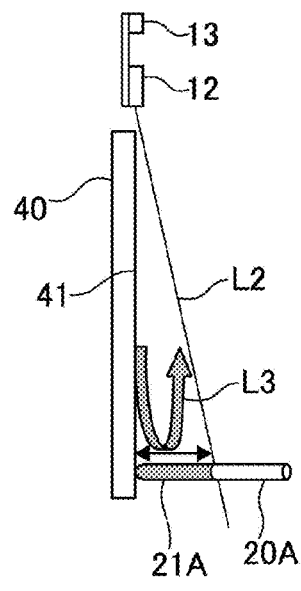
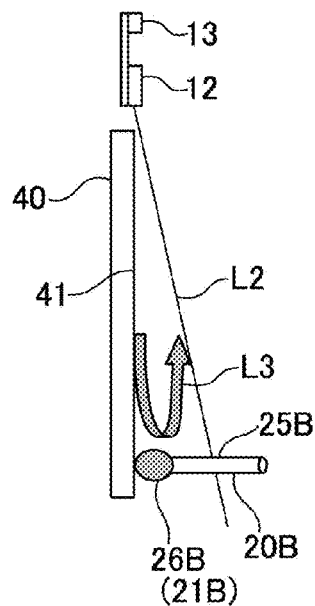
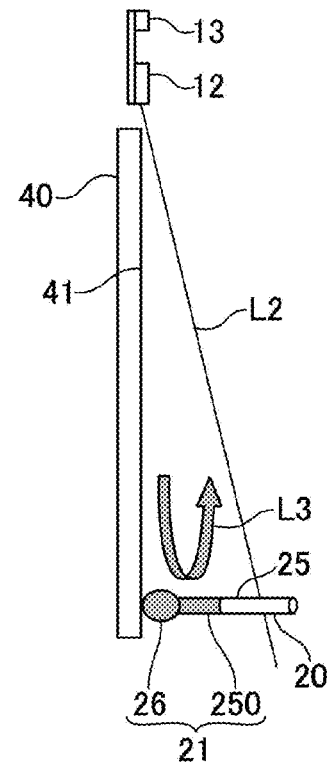
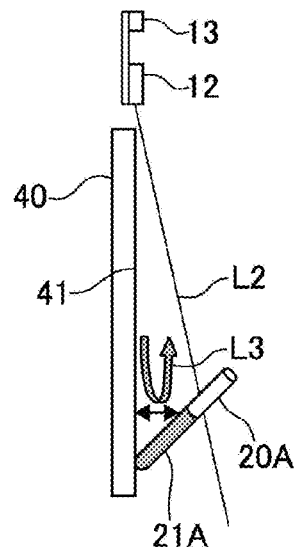
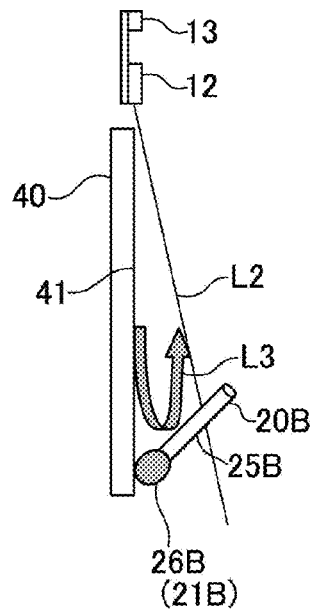
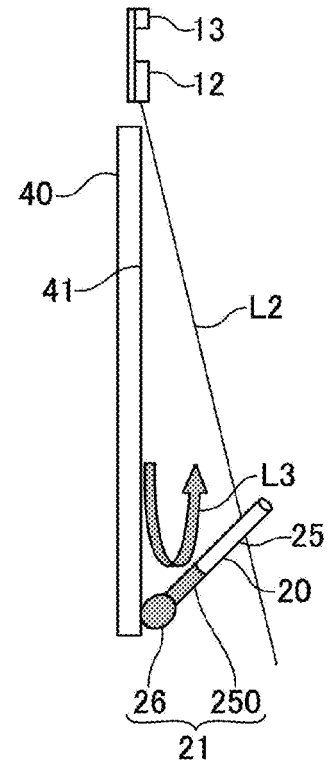
FIG. 9A
FIG. 9B
FIG. 9C

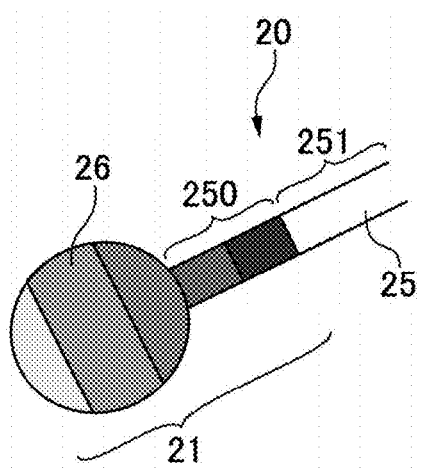
FIG.10A
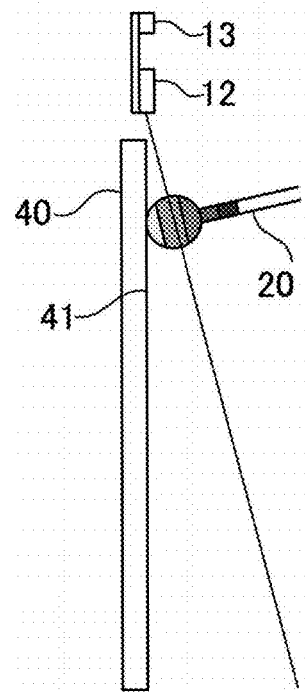 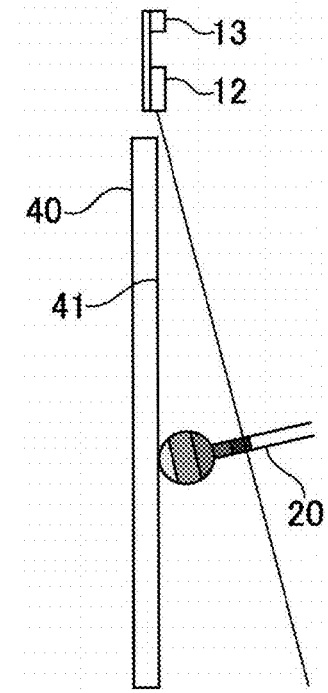
FIG.10B  FIG.10C

INDICATION MEMBER, OPTICAL POSITION DETECTION DEVICE, AND DISPLAY SYSTEM WITH INPUT FUNCTION

BACKGROUND

1. Technical Field

The present invention relates to an indication member that serves as an object to be detected at a position detection time, an optical position detection device having the indication member, and a display system including the position detection device.

2. Related Art

A known optical position detection device for optically detecting a target object includes a light receiving section provided at a position separated from a plurality of light source sections. When detection light is emitted from the plurality of light source sections toward a target object through a light transmissive member, detection light reflected from the target object is transmitted through the light transmissive member and is then detected by the light receiving section (refer to JP-T-2003-534554). Another known optical position detection device directs detection light emitted from a plurality of light source sections through a light guide plate. Detection light reflected from a target object is then detected by a light receiving section (refer to JP-A-2010-127671 and JP-A-2009-295318). In this optical position detection device, the position of the target object is detected by comparing the received light intensity in the light receiving section when some of the light source sections are lit with the received light intensity in the light receiving section when other light source sections are lit.

In the optical position detection devices disclosed in JP-T-2003-534554, JP-A-2010-127671, and JP-A-2009-295318, however, there is a problem in that the received light intensity in the light receiving section is low. This is because detection light that is scattered or diffusely reflected by the target object is received by the light receiving section. As a result, the detection accuracy is low. Further, even if a portion for regular (non-scattered and non-diffused) reflection is provided in the target object to solve such a problem, the received light intensity in the light receiving section is only significantly reduced if the target object is appropriately positioned. Accordingly, it is difficult to improve detection accuracy.

One proposal for improvement involves an indication member that has a round bar portion at its distal end so that the outer peripheral surface thereof serves as a retroreflective portion (refer to JP-A-2011-14107). With this indication member, detection light emitted from a light source section of an optical unit is reliably reflected from the retroreflective portion of the indication member and is then incident on a light receiving section of the optical unit. Therefore, there is an advantage in that the received light intensity in the light receiving section is high.

With the indication member disclosed in JP-A-2011-14107, however, position detection is performed on the basis of light reflected from the entire round bar portion serving as the retroreflective portion. For this reason, when the indication member is inclined, an intermediate part of the round bar portion in the longitudinal direction may be erroneously detected as an indication position even though the distal end of the round bar portion is at the indication position. Since the round bar portion cannot be elongated, there is a problem in that the effect of increasing the received light intensity in the light receiving section is small and detection accuracy cannot be sufficiently improved.

SUMMARY

An advantage of some aspects of the invention is to provide an indication member capable of accurately causing detection of the indication position regardless of its posture or position, an optical position detection device having the indication member, and a display system including the position detection device.

An aspect of the invention is directed to an indication member including a round bar shaped shaft portion and a spherical body portion provided at a distal end of the shaft portion. An outer peripheral surface of the spherical body portion and an outer peripheral surface of a shaft end portion of the shaft portion connected to the spherical body portion are a retroreflective portion.

The indication member according to the aspect of the invention includes the round bar shaped shaft portion and the spherical body provided at the distal end of the shaft portion, and the outer peripheral surface of the spherical body portion is the retroreflective portion. For this reason, detection light emitted from the light source section is reflected by the retroreflective portion of the indication member, and then the reflected light is incident on the light receiving section disposed near the light source section. Accordingly, the position of the distal end portion (retroreflective portion) of the indication member can be optically detected. Here, since the distal end side of the indication member is a spherical body portion, the projection area is large compared with the case where the distal end is just a round bar. Therefore, since the light intensity of the reflected light incident on the light receiving section is high, the position detection accuracy is high. Moreover, in the case of the spherical body portion, there is no change in the projection area even if the indication member is inclined. Therefore, the position detection accuracy is high even if the indication member is inclined. In addition, in order to increase the amount of light incident on the light receiving section only with the spherical body portion, it is necessary to enlarge the spherical body portion. In this case, there may be a problem in that the indication position becomes unclear, for example. In the indication member according to the aspect of the invention, however, the outer peripheral surface of the shaft end portion connected to the spherical body portion in the shaft portion serves as a retroreflective portion. As a result, the amount of light incident on the light receiving section can be increased. Here, when the indication member is located close to the light source section, detection light is emitted to only the spherical body portion and is not emitted to the shaft end portion. However, when the indication member is located close to the light source section, the amount of light incident on the light receiving section is large even if the detection light is not emitted to the shaft end portion. Therefore, the indication position can be accurately detected. In contrast, when the indication member is located far from the light source section, detection light is emitted to the spherical body portion and the shaft end portion. Therefore, when the indication member is located far from the light source section, the indication position can also be accurately detected since the amount of light incident on the light receiving section is large. In this case, if the indication member is inclined, the position of the spherical body portion and the position of the shaft end portion are misaligned. However, since the projection area of the spherical body portion is larger than that of the shaft end portion, the detection error can be reduced.

In the indication member according to the aspect of the invention, it is preferable that the degree of retroreflection of the retroreflective portion increases from a distal end side toward a base end side in the spherical body portion and the shaft end portion. According to this configuration, when the indication member is close to a light source section, detection light is emitted to a narrow region of the retroreflective portion since the detection light is emitted to only the distal end side of the indication member. In contrast, when the indication member is far from the light source section, detection light is emitted to a wide region of the retroreflective portion since the detection light is emitted to a wide region from the distal end side to the base end side of the indication member. Also in such a case, according to the configuration in which the degree of retroreflection increases from the distal end side toward the base end side in the spherical body portion and the shaft end portion, it is possible to reduce the difference between the amount of detection light reaching the light receiving section when the indication member is close to the light source section and the amount of detection light reaching the light receiving section when the indication member is far from the light source section. Therefore, it is possible to realize the same detection accuracy in the case where the indication member is close to the light source section and the case where the indication member is far from the light source section.

In the indication member according to the aspect of the invention, it is preferable that the length of the shaft end portion be smaller than the diameter of the spherical body portion. According to this configuration, even if the indication member is inclined in a state where the detection light is emitted to the spherical body portion and the shaft end portion, it is possible to reduce a detection error caused by misalignment between the position of the spherical body portion and the position of the shaft end portion.

In the indication member according to the aspect of the invention, it is preferable that the shaft end portion be movable into the spherical body portion. According to this configuration, since the exposure area of the shaft end portion can be changed, it is possible to selectively use a support member depending on the situation. For example, it is possible to reduce the exposure of the shaft end portion when the indication member is close to the light source section and to increase the exposure of the shaft end portion when the indication member is far from the light source section.

The indication member according to the aspect of the invention may be configured such that the shaft end portion is movable into a cylindrical portion connected to a base end side of the shaft end portion. According to this configuration, since the exposure area of the shaft end portion can be changed, it is possible to selectively use a support member depending on the situation. For example, it is possible to reduce the exposure of the shaft end portion when the indication member is close to the light source section and to increase the exposure of the shaft end portion when the indication member is far from the light source section.

In the indication member according to the aspect of the invention, it is preferable that the shaft end portion is an extension and contraction portion in which a plurality of cylindrical portions with different diameters are provided, and outer peripheral surfaces of the plurality of cylindrical portions serve as the retroreflective portion. According to this configuration, since the area of the shaft end portion can be changed, it is possible to selectively use a support member depending on the situation. For example, it is possible to reduce the exposure of the shaft end portion when the indication member is close to the light source section and to increase the exposure of the shaft end portion when the indication member is far from the light source section.

In the indication member according to the aspect of the invention, it is preferable that a portion of the shaft portion connected to a base end side of the shaft end portion have a light absorbing property. According to this configuration, since a reflection region in the indication member can be limited, a detection error when the indication member is inclined can be reduced.

Another aspect of the invention is directed to an optical position detection device whose object to be position-detected is the indication member described above and which includes: a light source section that emits detection light; a light receiving section that receives the detection light reflected by the retroreflective portion of the indication member located in an emission space of the detection light; and a position detecting section that detects a position of the indication member on the basis of a received light intensity in the light receiving section.

The optical position detection device according to the aspect of the invention may be configured such that the light source section performs a first lighting operation, in which the emission intensity of the detection light decreases from one side toward the other side of the emission space, and a second lighting operation, in which the emission intensity of the detection light decreases from the other side toward the one side in a different period, and the position detecting section detects the position of the indication member on the basis of a comparison result of the received light intensity in the light receiving section at the time of the first lighting operation and the received light intensity in the light receiving section at the time of the second lighting operation.

In this case, it is preferable that the position detecting section detects the position of the indication member on the basis of a comparison result of a value of a first driving current supplied to the light source section at the time of the first lighting operation and the value of a second driving current supplied to the light source section at the time of the second lighting operation when the received light intensity in the light receiving section at the time of the first lighting operation becomes equal to the received light intensity in the light receiving section at the time of the second lighting operation. According to this configuration, the detection accuracy is improved in proportion to the received light intensity in the light receiving section, unlike the case where a change in the received light intensity in the light receiving section according to the position of the target object is simply used. Therefore, the effect when a retroreflective portion is formed in the indication member is remarkable.

The optical position detection device according to the aspect of the invention may be used in various kinds of systems, such as a display system with an input function. For example, in a display system with an input function which includes the optical position detection device described above and a display device with a display surface on which an image is displayed and in which the image is changed on the basis of the detection result of the optical position detection device regarding a position of the indication member in a direction along the display surface, the optical position detection device described above may be used as the optical position detection device. In addition, in a display system with an input function which includes the optical position detection device described above and an image projection apparatus that projects an image and in which the image is changed on the basis of the detection result of the optical position detection device regarding a position of the indication member in a direction crossing the projection direction of the image, the optical position detection device described above may be used as the optical position detection device.

BRIEF DESCRIPTION OF THE DRAWINGS

The invention will be described with reference to the accompanying drawings, wherein like numbers reference like elements.

FIGS. 9A to 9C are explanatory views showing the effects obtained by using the indication member according to the first embodiment of the invention.

FIGS. 10A to 10C are explanatory views of an indication member used in a position detection system according to a second embodiment of the invention.

DESCRIPTION OF EXEMPLARY EMBODIMENTS

Figure 1A:
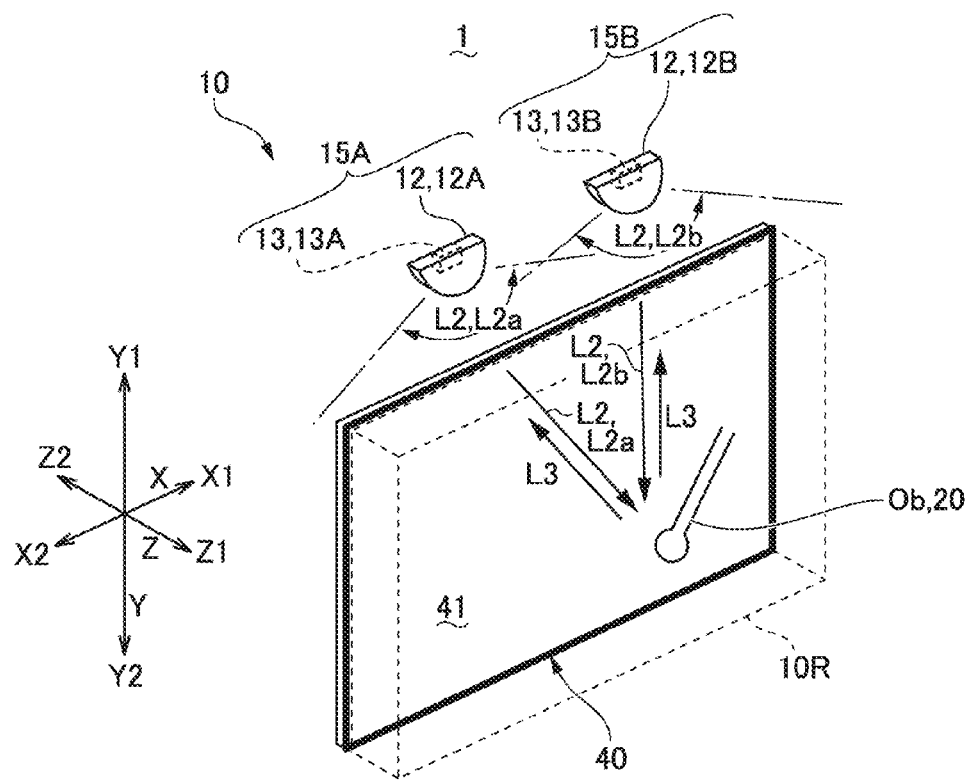
FIGS. 1A and 1B are explanatory views schematically showing sections of a position detection system according to a first embodiment of the invention.

Next, embodiments of the invention will be described with reference to the accompanying drawings. In the following explanation, it is assumed that directions crossing each other are the X-axis direction and the Y-axis direction and a direction crossing both the X-axis direction and the Y-axis direction is the Z-axis direction. Moreover, in the drawings referred to below, the opposite sides of the X-axis direction are respectively expressed as the X1 and X2 sides, the opposite sides of the Y-axis direction are respectively expressed as the Y1 and Y2 sides, and the opposite sides of the Z-axis direction are respectively expressed as the Z1 and Z2 sides.

First Embodiment

Overall Configuration

Figure 1B:
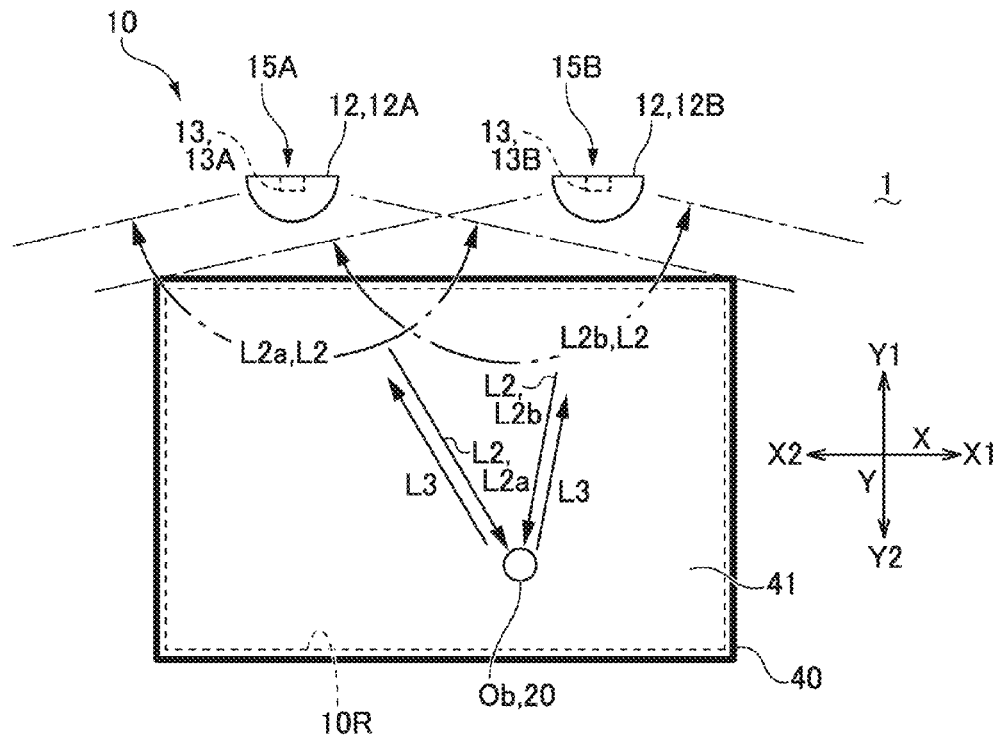

FIGS. 1A and 1B are explanatory views schematically showing sections of a position detection system according to a first embodiment of the invention. FIG. 1A is an explanatory view when the position detection system is viewed from the oblique direction at the side of a detection light emission space, and FIG. 1B is an explanatory view when the position detection system is viewed from the front.

In FIGS. 1A and 1B, a position detection system 1 according to the present embodiment includes an optical position detection device 10 which detects the position of a target object Ob. The optical position detection device 10 detects the position of the target object Ob using detection light L2 emitted radially along the XY plane. In the present embodiment, the position detection system 1 includes a viewing surface forming member 40 having a viewing surface 41 extending along the XY plane at the one side Z1 of the Z-axis direction. The optical position detection device 10 emits the detection light L2 along the viewing surface 41, and detects the position of the target object Ob located at the viewing surface 41 side (one side Z1 of the Z-axis direction) of the viewing surface forming member 40. Therefore, a space to be detected 10R of the position detection system 1 is a space where the detection light L2 is emitted in the optical position detection device 10. Due to the optical position detection device 10, the position detection system 1 may be used as a display system with an input function such as an electronic blackboard which detects the position (XY coordinates) of the target object Ob on the XY plane within the space to be detected 10R, a projection type display system with an input function, and the like, which will be described later. In the present embodiment, an indication member 20, which will be described later, is used as the target object Ob.

In the position detection system 1 according to the present embodiment, the optical position detection device 10 includes a linear light source section 12 (linear light source section), which emits the detection light L2 radially along the viewing surface 41 (XY plane), and a light receiving section 13, which receives the detection light L2 (reflected light L3) reflected from the target object Ob located in the emission space (space to be detected 10R) of the detection light L2.

In the present embodiment, first and second light source sections 12A and 12B which face the space to be detected 10R at positions separated from the viewing surface forming member 40 at the one side Y1 of the Y-axis direction are used as the light source section 12. The first and second light source sections 12A and 12B are separated from each other in the X-axis direction and are at the same position in the Y-axis direction. Moreover, in the present embodiment, first and second light receiving sections 13A and 13B which face the space to be detected 10R at positions separated from the viewing surface forming member 40 at the one side Y1 of the Y-axis direction are used as the light receiving section 13. The first and second light receiving sections 13A and 13B are separated from each other in the X-axis direction and are at the same position in the Y-axis direction.

Here, the first light receiving section 13A is disposed at the radiation center of the detection light L2 (detection light L2$a$) emitted radially from the first light source section 12A, and the first light receiving section 13A and the first light source section 12A are unified as a first light emission and reception unit 15A. In addition, the second light receiving section 13B is disposed at the radiation center of the detection light L2 (detection light L2$b$) emitted radially from the second light source section 12B, and the second light receiving section 13B and the second light source section 12B are unified as a second light emission and reception unit 15B.

As will be described later, each of the light source sections 12 (first and second light source sections 12A and 12B) includes a light source formed by an LED (light emitting diode). The light source emits radially the detection light L2 (detection light L2$a$ and L2$b$) of infrared light, which has a peak wavelength of 840 to 1000 nm. In addition, the light receiving section 13 includes light receiving elements, such as a photodiode and a phototransistor. In the present embodiment, the light receiving section 13 includes a photodiode with a peak sensitivity in the infrared region.

The first and second light emission and reception units 15A and 15B are located at positions protruding toward the one side Z1 of the Z-axis direction from the viewing surface forming member 40. In addition, the first and second light emission and reception units 15A and 15B operate at different timings. More specifically, when the detection light L2$a$ is emitted from the first light source section 12A in the first light emission and reception unit 15A, the first light receiving section 13A receives the detection light L2$a$ (reflected light L3) reflected from the target object Ob located in the space to be detected 10R. At a different timing from this operation, when the detection light L2$b$ is emitted from the second light source section 12B in the second light emission and reception unit 15B, the second light receiving section 13B receives the detection light L2$b$ (reflected light L3) reflected from the target object Ob located in the space to be detected 10R.

Specific Configuration of the Light Source Section 12

Figure 2:
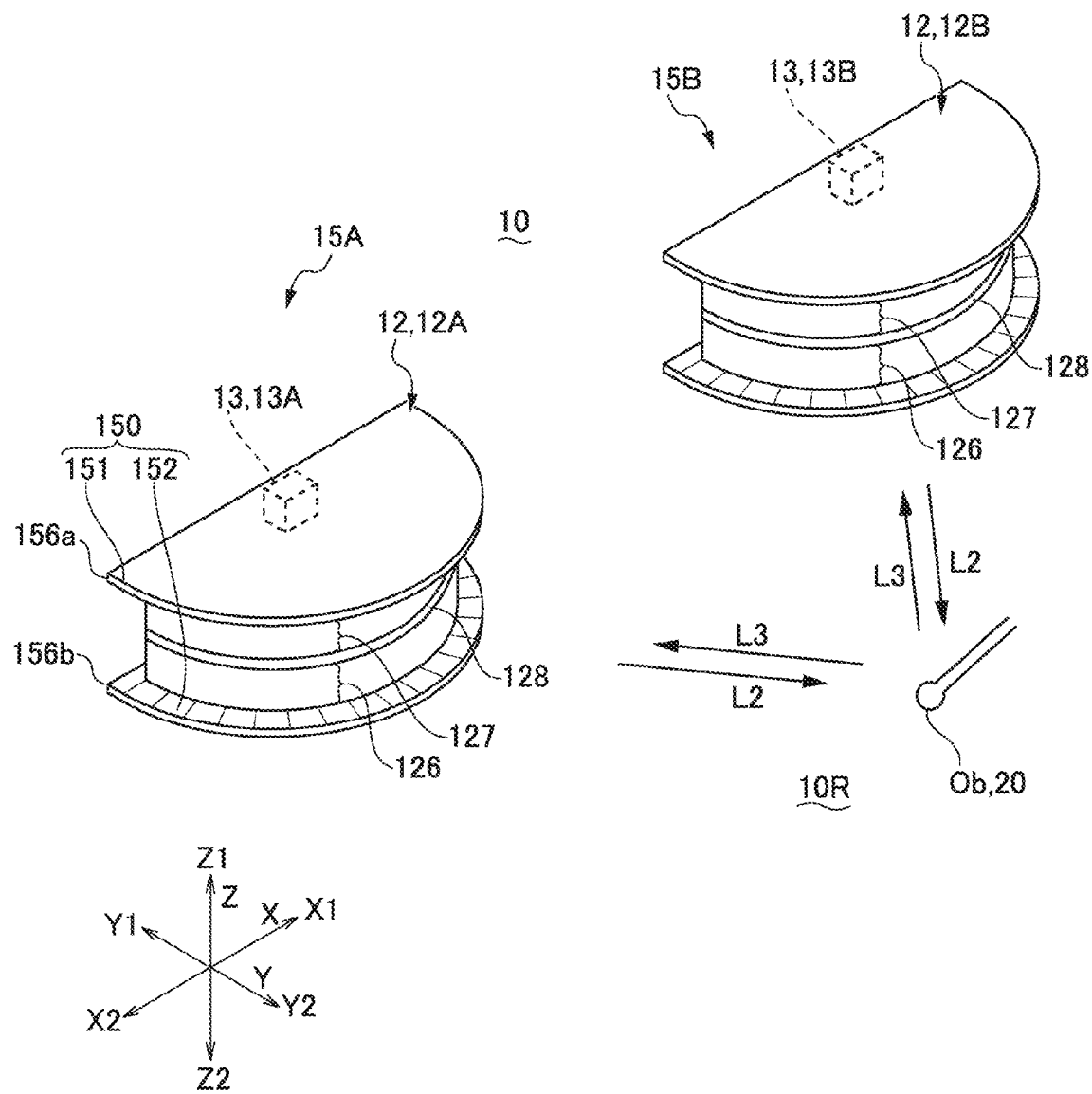
FIG. 2 is an explanatory view of a light emission and reception unit of an optical position detection device used in the position detection system according to the first embodiment of the invention.
Figure 3:
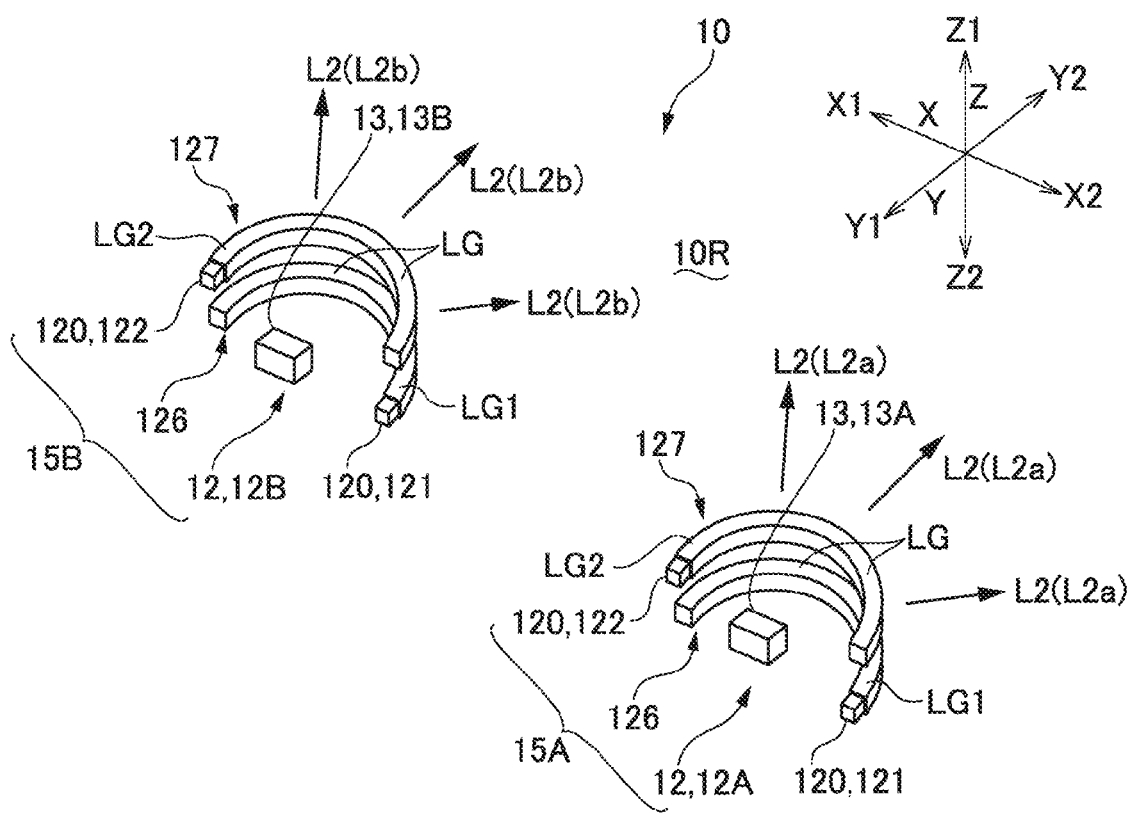
FIG. 3 is an explanatory view showing the configuration of sections of the light emission and reception unit shown in FIG. 2.
Figure 4A:
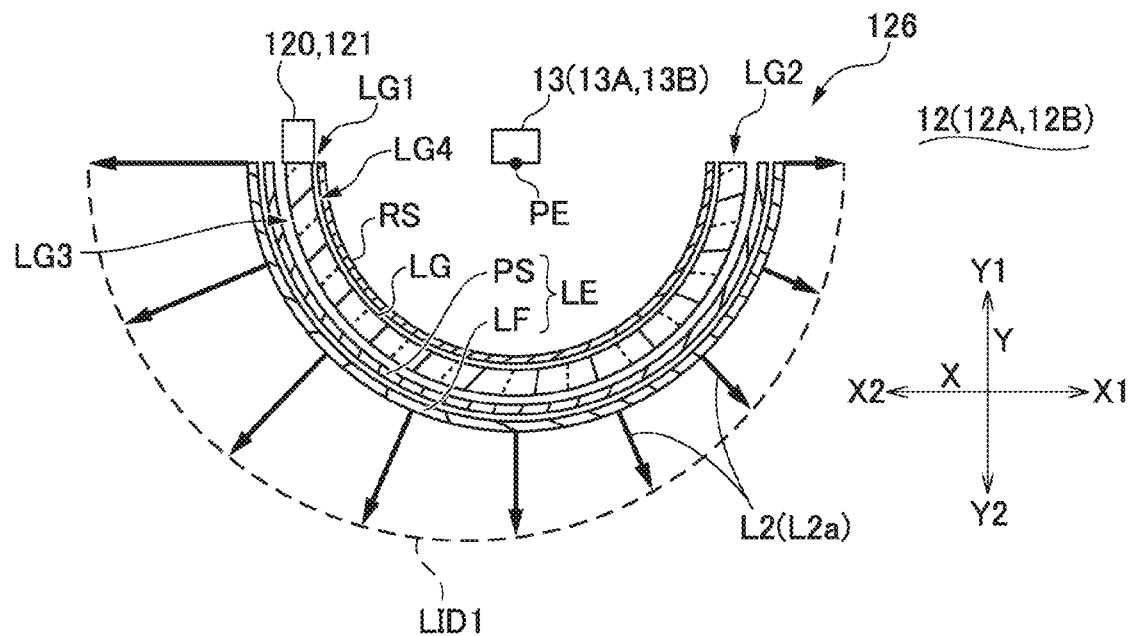
FIGS. 4A and 4B are explanatory views schematically showing the configuration of a light source section provided in the light emission and reception unit shown in FIG. 3.
Figure 4B:
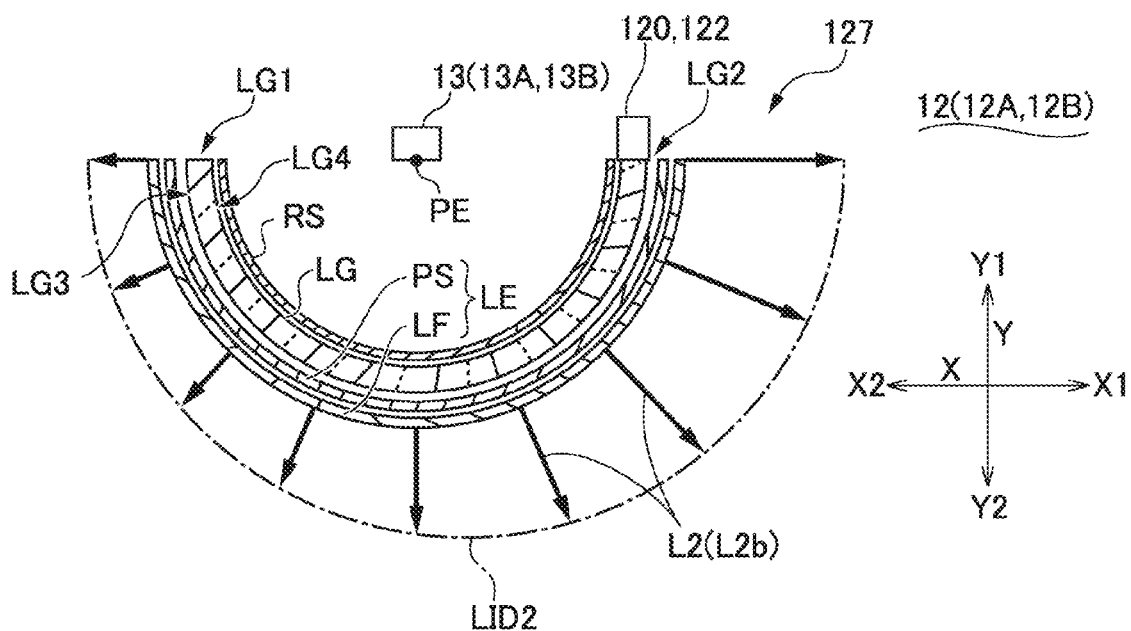

FIG. 2 is an explanatory view of a light emission and reception unit of the optical position detection device 10 used in the position detection system 1 according to the first embodiment of the invention. FIG. 3 is an explanatory view showing the configuration of sections of the light emission and reception unit shown in FIG. 2. FIGS. 4A and 4B are explanatory views schematically showing the configuration of the light source section 12 provided in the light emission and reception unit shown in FIG. 3. FIG. 4A is an explanatory view showing a state where the detection light L2 is emitted at the time of first lighting operation, and FIG. 4B is an explanatory view showing a state where the detection light L2 is emitted at the time of second lighting operation.

As shown in FIG. 2, in the optical position detection device 10 according to the present embodiment, the first and second light emission and reception units 15A and 15B have the same configuration. Accordingly, the first and second light source sections 12A and 12B also have the same configuration. More specifically, the first light emission and reception unit 15A has a light source support member 150 with a fan shape or a semicircular shape when viewed from the Z-axis direction. This light source support member 150 has a structure in which first and second light source support members 151 and 152 overlap each other in the Z-axis direction. The first and second light source support members 151 and 152 have fan-shaped or semicircular flanges 156$a$ and 156$b$, respectively. A portion interposed between the flanges 156$a$ and 156$b$ is a light emitting section which emits the detection light L2 from the first light source section 12A, and the flanges 156$a$ and 156$b$ limit the emission range of the detection light L2 in the Z-axis direction.

In the first light emission and reception unit 15A, the first light source section 12A includes first and second light source modules 126 and 127, which are disposed so as to overlap each other in the Z-axis direction, as an emission section of the detection light L2. In the first light source section 12A, a portion interposed between the first and second light source modules 126 and 127 in the Z-axis direction is a transmissive light guide section 128, and the first light receiving section 13A including a photodiode is disposed at the back of the light guide section 128. In the first light emission and reception unit 15A, the central angle of the light source support member 150 is about 180°, and the first light source section 12A is formed over the angle range of about 180°. Since the second light emission and reception unit 15B also has the same configuration as the first light emission and reception unit 15A, explanation thereof will be omitted.

As shown in FIG. 3, in the first light emission and reception unit 15A, each of the first and second light source modules 126 and 127 includes a light source 120 formed by a light emitting element, such as a light emitting diode, and an arc-shaped light guide LG. Also in the second light emission and reception unit 15B, each of the first and second light source modules 126 and 127 includes a light source 120 formed by a light emitting element, such as a light emitting diode, and an arc-shaped light guide LG, similar to the first light emission and reception unit 15A.

More specifically, as shown in FIGS. 4A and 4B, the first light source module 126 includes, as the light source 120, a first light source 121 formed by a light emitting element, such as a light emitting diode which emits infrared light, and also includes the arc-shaped light guide LG. The first light source 121 is disposed at one end LG1 of the light guide LG. In addition, the first light source module 126 includes an arc-shaped emission direction setting section LE, which has an optical sheet PS, a louver film LF, and the like, along an arc-shaped outer peripheral surface LG3 of the light guide LG and also includes an arc-shaped reflection sheet RS along an arc-shaped inner peripheral surface LG4 of the light guide LG. Similar to the first light source module 126, the second light source module 127 includes, as the light source 120, a second light source 122 formed by a light emitting element, such as a light emitting diode which emits infrared light, and also includes the arc-shaped light guide LG. The second light source 122 is disposed at the other end LG2 of the light guide LG. In addition, similar to the first light source module 126, the second light source module 127 includes an arc-shaped emission direction setting section LE, which has an optical sheet PS, a louver film LF, and the like, along the arc-shaped outer peripheral surface LG3 of the light guide LG and also includes an arc-shaped reflection sheet RS along the arc-shaped inner peripheral surface LG4 of the light guide LG. In addition, machining for adjusting the emission efficiency of the detection light L2 from the light guide LG is performed on at least one of the outer peripheral surface LG3 and the inner peripheral surface LG4 of the light guide LG. As the machining method, it is possible to adopt a method of printing a reflection dot, a molding method of forming the irregularities using a stamper or by injection, or a groove machining method, for example. Since the second light emission and reception unit 15B also has the same configuration as the first light emission and reception unit 15A, explanation thereof will be omitted.

Configuration of a Position Detecting Section and the Like

Figure 5:
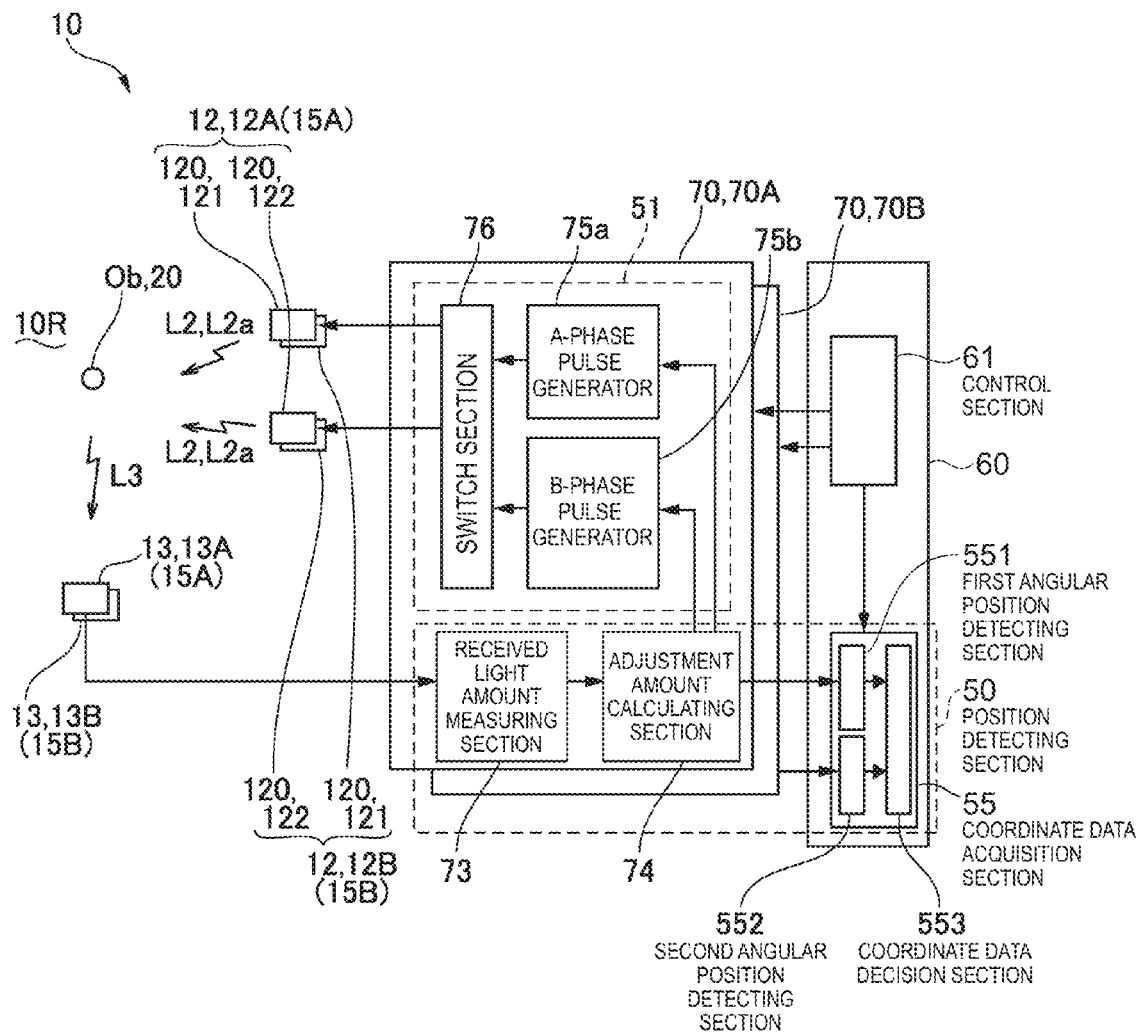
FIG. 5 is an explanatory view showing the electrical configuration of the optical position detection device used in the position detection system according to the first embodiment of the invention.

FIG. 5 is an explanatory view showing the electrical configuration and the like of the optical position detection device 10 used in the position detection system 1 according to the first embodiment of the invention.

In the optical position detection device 10 used in the position detection system 1 of the present embodiment, the first and second light emission and reception units 15A and 15B described with reference to FIGS. 1A to 4B are electrically connected to a control IC 70 shown in FIG. 5. Here, the control IC 70 includes a first control IC 70A electrically connected to the first light emission and reception unit 15A and a second control IC 70B electrically connected to the second light emission and reception unit 15B, and the first light source section 12A and the first light receiving section 13A of the first light emission and reception unit 15A are electrically connected to the first control IC 70A. In addition, the second light source section 12B and the second light receiving section 13B of the second light emission and reception unit 15B are electrically connected to the second control IC 70B.

The first and second control ICs 70A and 70B have the same configuration, and both the first and second control ICs 70A and 70B are electrically connected to a common control device 60. First, the first control IC 70A includes a plurality of circuits (not shown) which generate a reference clock, an A-phase reference pulse, a B-phase reference pulse, a timing control pulse, asynchronous clock, and the like. In addition, the first control IC 70A includes a pulse generator 75a which generates a predetermined driving pulse on the basis of an A-phase reference pulse, a pulse generator 75b which generates a predetermined driving pulse on the basis of a B-phase reference pulse, and a switch section 76 which controls to which of the first and second light sources 121 and 122 of the first light source section 12A the driving pulses generated by the pulse generators 75a and 75b are to be applied. The pulse generators 75a and 75b and the switch section 76 form a light source driving unit 51.

In addition, the first control IC 70A includes a received light amount measuring section 73, which includes an amplifier that amplifies the detection result of the first light receiving section 13A, and an adjustment amount calculating section 74, which adjusts the driving current value (first driving current value) of a driving pulse supplied to the light source 120 (first and second light sources 121 and 122) of the first light source section 12A by controlling the pulse generators 75a and 75b on the basis of a measurement result of the received light amount measuring section 73. The received light amount measuring section 73 and the adjustment amount calculating section 74 have some functions of the position detecting section 50.

Similar to the first control IC 70A, the second control IC 70B includes a received light amount measuring section 73 which includes an amplifier that amplifies the detection result of the second light receiving section 13B, an adjustment amount calculating section 74 which adjusts the value of a second driving current supplied to the light source 120 (first and second light sources 121 and 122) of the second light source section 12B by controlling the pulse generators 75a and 75b on the basis of a measurement result of the received light amount measuring section 73, and the like. The received light amount measuring section 73 and the adjustment amount calculating section 74 have some functions of the position detecting section 50.

The first and second control ICs 70A and 70B are controlled by a control section 61 of the high-order control device 60, such as a personal computer. The control device 60 has a coordinate data acquisition section 55 which forms the position detecting section 50 together with the received light amount measuring section 73 and the adjustment amount calculating section 74. In the present embodiment, therefore, the position detecting section 50 is formed by the received light amount measuring section 73 and the adjustment amount calculating section 74 of the control IC 70 (first and second control ICs 70A and 70B) and the coordinate data acquisition section 55 of the high-order control device 60 (personal computer).

In the present embodiment, the first and second light source sections 12A and 12B disposed at separate positions are provided as the light source section 12. Accordingly, the coordinate data acquisition section 55 includes a first angular position detecting section 551, which detects the angular position of the target object Ob with respect to the radiation center of the first light source section 12A on the basis of a driving result of the first light source section 12A, and a second angular position detecting section 552, which detects the angular position of the target object Ob with respect to the radiation center of the second light source section 12B on the basis of a driving result of the second light source section 12B. In addition, the coordinate data acquisition section 55 includes a coordinate data decision section 553 which decides the XY coordinate data of the target object Ob on the basis of the angular position of the target object Ob obtained by the first angular position detecting section 551 and the angular position of the target object Ob obtained by the second angular position detecting section 552.

In addition, although the two control ICs 70 (first and second control ICs 70A and 70B) are used in one-to-one correspondence for the first and second light emission and reception units 15A and 15B in the present embodiment, the control IC 70 may be formed to have multiple channels so that the first and second light emission and reception units 15A and 15B are driven by one control IC 70.

Coordinate Detection Principle

Figure 6A:
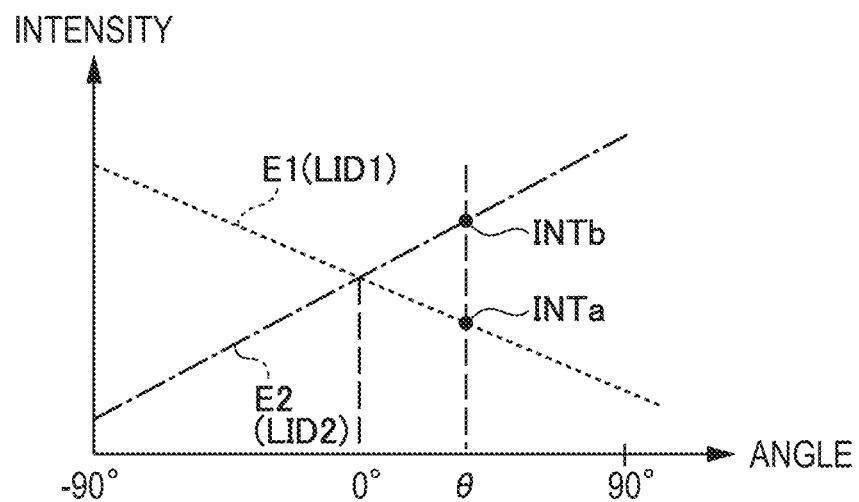
FIGS. 6A and 6B are explanatory views showing the position detection principle in the position detection system according to the first embodiment of the invention.
Figure 6B:
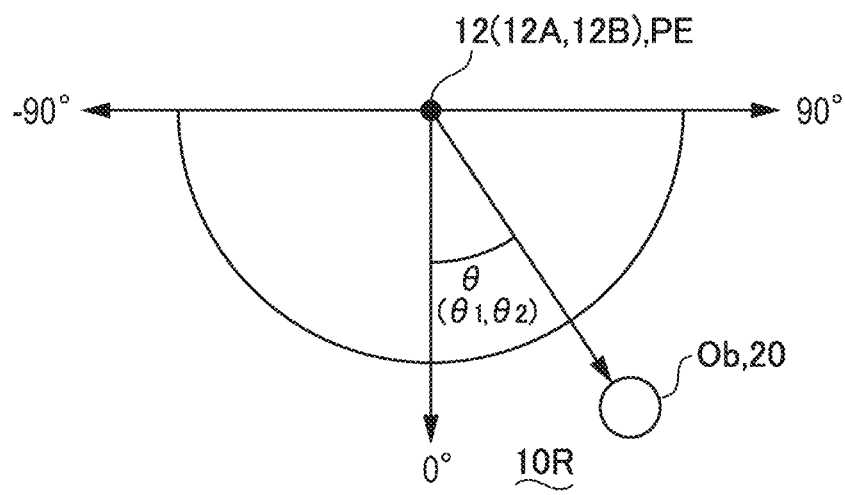
Figure 7:
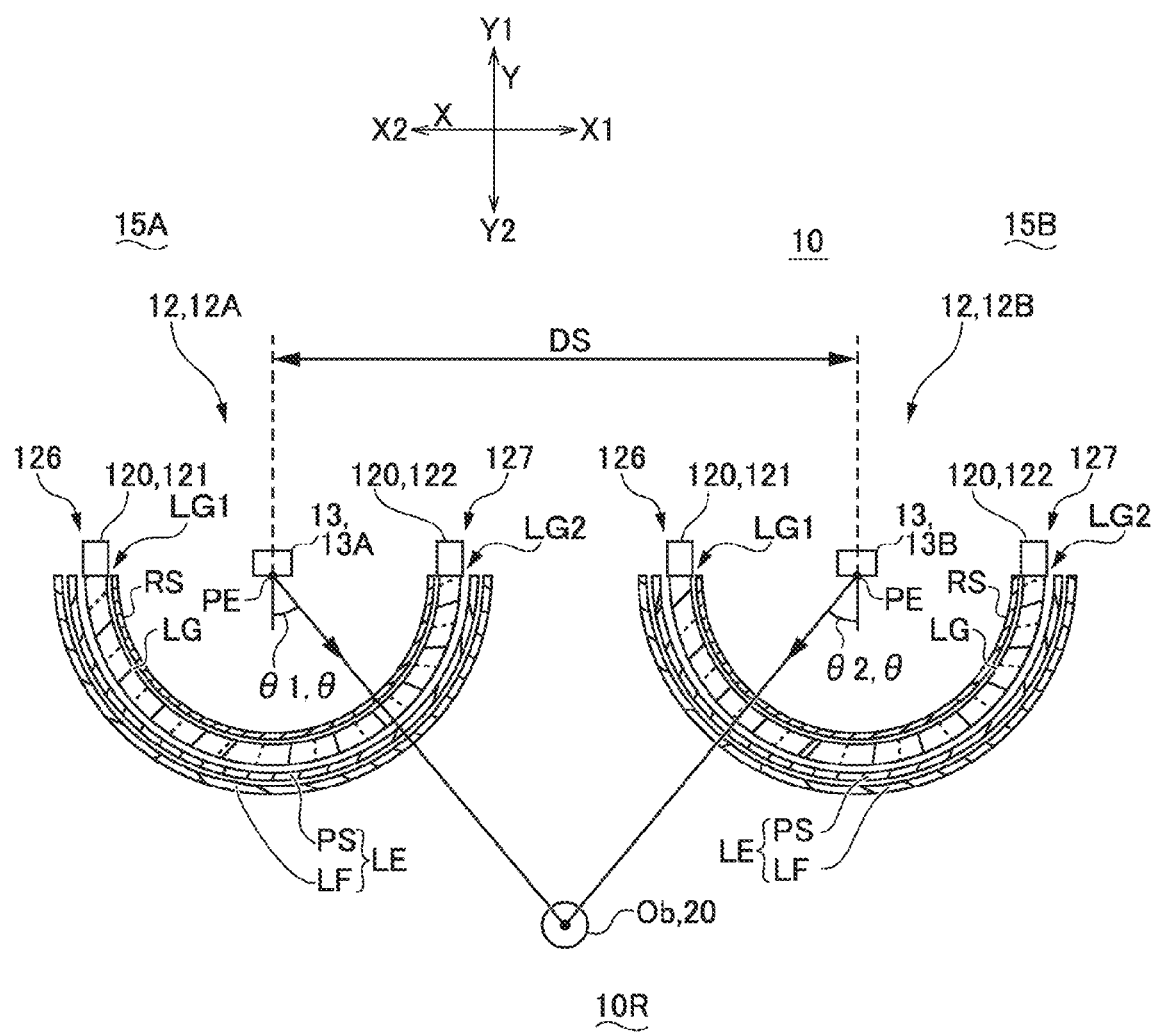
FIG. 7 is an explanatory view showing the principle of acquiring the XY coordinate data of a target object in the position detection system according to the first embodiment of the invention.

FIGS. 6A and 6B are explanatory views showing the position detection principle in the position detection system 1 according to the first embodiment of the invention. FIG. 6A is an explanatory view of the light intensity distribution, and FIG. 6B is an explanatory view of a method of acquiring the position information (azimuth information) regarding the position where a target object is present. FIG. 7 is an explanatory view showing the principle of acquiring the XY coordinate data of the target object Ob in the position detection system 1 according to the first embodiment of the invention.

As shown in FIGS. 4A and 4B, in the optical position detection device 10 according to the present embodiment, the light source driving unit 51 described with reference to FIG. 5 makes both the light source sections 12 (first and second light source sections 12A and 12B) perform a first lighting operation in which the emission intensity of the detection light L2 decreases from one side toward the other side of the emission angle range of the detection light L2 in the first period and a second lighting operation in which the emission intensity of the detection light L2 decreases from the other side toward the one side of the emission angle range of the detection light L2 in the second period which does not overlap the first period.

More specifically, the light source driving unit 51 makes the first light source section 12A turn on the first light source 121 of the first light source module 126 at the time of the first lighting operation so that the detection light L2 is emitted to the space to be detected 10R. In this case, the second light source 122 is turned off. As a result, the first light intensity distribution LID1 is formed in the space to be detected 10R. The first light intensity distribution LID1 is an intensity distribution in which the intensity decreases monotonically from the angular direction corresponding to the one end LG1 toward the angular direction corresponding to the other end LG2, as shown by arrows in FIG. 4A whose lengths indicate the intensities of emitted light.

In addition, the light source driving unit 51 makes the first light source section 12A turn on the second light source 122 of the second light source module 127 at the time of the second lighting operation so that the detection light L2 is emitted to the space to be detected 10R. In this case, the first light source 121 is turned off. As a result, the second light intensity distribution LID2 is formed in the space to be detected 10R. The second light intensity distribution LID2 is an intensity distribution in which the intensity decreases monotonically from the angular direction corresponding to the other end LG2 toward the angular direction corresponding to the one end LG1, as shown by arrows in FIG. 4B whose lengths indicate the intensities of emitted light.

Moreover, in both the first lighting operation of the second light source section 12B in which the first light source 121 of the first light source module 126 is lit and the second lighting operation of the second light source section 12B in which the second light source 122 of the second light source module 127 is lit, the first light intensity distribution LID1 and the second light intensity distribution LID2 are formed, in the same manner as in the first light source section 12A. Therefore, if the first light intensity distribution LID1 and the second light intensity distribution LID2 are used, the position of the target object Ob can be detected since a distance DS (refer to FIG. 7) between the center PE of the first light source section 12A and the center PE of the second light source section 12B is fixed. This will be described later.

Detection of the Angular Position of the Target Object Ob

First, when the first light intensity distribution LID1 is formed by the first light source module 126 of the first light source section 12A, the emission direction of the detection light L2 and the intensity of the detection light L2 are in the linear relationship shown by the line E1 in FIG. 6A. In addition, when the second light intensity distribution LID2 is formed by the second light source module 127 of the first light source section 12A, the emission direction of the detection light L2 and the intensity of the detection light L2 are in the linear relationship shown by the line E2 in FIG. 6A. Here, as shown in FIGS. 6B and 7, it is assumed that the target object Ob is present in the direction of an angle θ when viewed from the center PE of the first light source section 12A (center of the first light source module 126/radiation center of the detection light L2). In this case, when the first light intensity distribution LID1 is formed, the intensity of the detection light L2 at the position where the target object Ob is present becomes INTa. On the other hand, when the second light intensity distribution LID2 is formed, the intensity of the detection light L2 at the position where the target object Ob is present becomes INTb. Accordingly, if the relationship between the intensities INTa and INTb is obtained by comparing the detected intensity in the first light receiving section 13A when the first light intensity distribution LID1 is formed with the detected intensity in the second light receiving section 13B when the second light intensity distribution LID2 is formed, it is possible to calculate the angle θ (angle θ1/angular position) in a direction, in which the target object Ob is located, with the center PE of the first light source section 12A as a reference, as shown in FIGS. 6B and 7.

In the present embodiment, when detecting the angular position (angle θ1) of the target object Ob using such a principle, the first driving current value for the first light source 121 and the second driving current value for the second light source 122 are adjusted such that the detected intensity in the first light receiving section 13A when the first light intensity distribution LID1 is formed by the first light source module 126 in the first light source section 12A becomes equal to the detected intensity in the first light receiving section 13A when the second light intensity distribution LID2 is formed by the second light source module 127. Here, the emission intensity of the detection light L2 emitted from the first light source section 12A is proportional to the first driving current value for the first light source 121 and the second driving current value for the second light source 122. Therefore, the angle θ (angle θ1) in a direction in which the target object Ob is located can be calculated from the ratio or the difference between the first and second driving current values after adjusting the first driving current value for the first light source 121 and the second driving current value for the second light source 122 or from the ratio or the difference between the adjustment amounts when the driving current values are adjusted.

More specifically, first, the light source driving unit 51 of the first control IC 70A shown in FIG. 5 forms the first light intensity distribution LID1 by turning on the first light source 121 as the first lighting operation and then forms the second light intensity distribution LID2 by turning on the second light source 122 as the second lighting operation. In this case, intensity change directions of the first light intensity distribution LID1 and the second light intensity distribution LID2 are opposite directions, but the intensity levels of the first light intensity distribution LID1 and the second light intensity distribution LID2 are the same. Then, the adjustment amount calculating section 74 of the position detecting section 50 shown in FIG. 5 compares the received light intensity INTa of the first light receiving section 13A at the time of the first lighting operation with the received light intensity INTb of the first light receiving section 13A at the time of the second lighting operation. When the received light intensities INTa and INTb are different, the first driving current value for the first light source 121 and the second driving current value for the second light source 122 are adjusted such that the received light intensity INTa of the first light receiving section 13A at the time of the first lighting operation becomes equal to the received light intensity INTb of the first light receiving section 13A at the time of the second lighting operation. Then, if the received light intensity INTa of the first light receiving section 13A at the time of the first lighting operation and the received light intensity INTb of the first light receiving section 13A at the time of the second lighting operation are equal when the first and second lighting operations are performed again, the first angular position detecting section 551 shown in FIG. 5 calculates the angle θ (angle θ1) in a direction in which the target object Ob is located from the ratio or the difference between the driving currents for the first and second light sources 121 and 122 after performing such adjustment or from the ratio or the difference between the adjustment amounts of the driving currents.

If this operation is also performed in the second light source section 12B, the second angular position detecting section 552 shown in FIG. 5 can calculate the angle θ (angle θ2/angular position) in a direction in which the target object Ob is located with the center PE of the second light source section 12B as a reference.

Therefore, the coordinate data decision section 553 shown in FIG. 5 acquires, as data of the XY coordinates at which the target object Ob is located, a position equivalent to the point of intersection between the angular position (direction of the angle θ1) detected by the first angular position detecting section 551 and the angular position (direction of the angle θ2) detected by the second angular position detecting section 552.

Configuration of an Indication Member

Figure 8A:
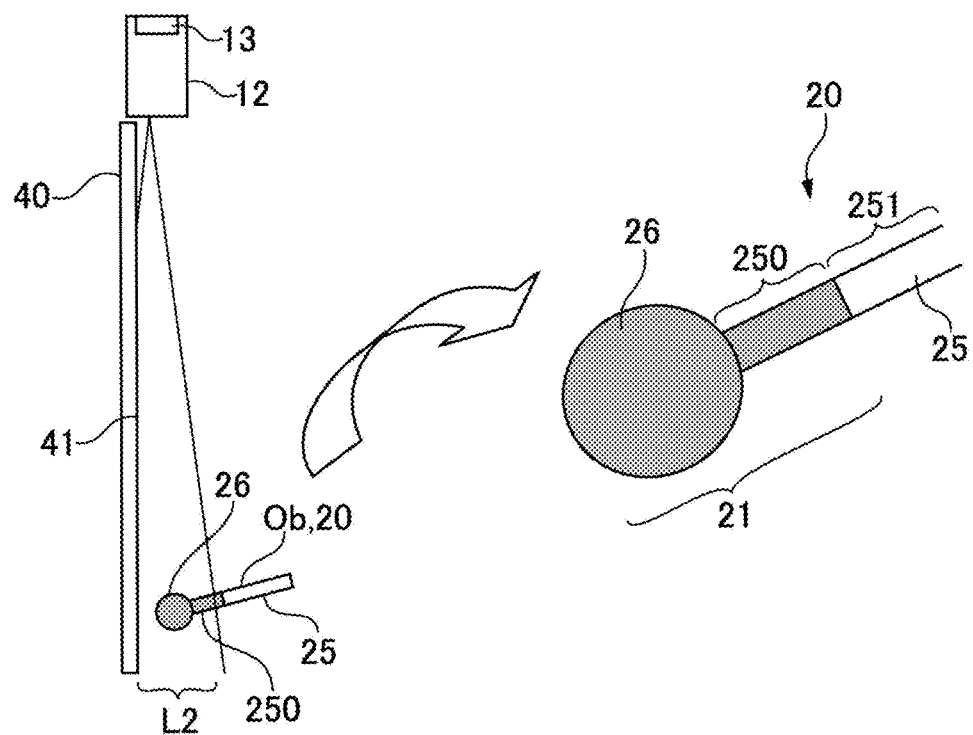
FIGS. 8A to 8C are explanatory views of an indication member used in the position detection system according to the first embodiment of the invention.
Figure 8B:
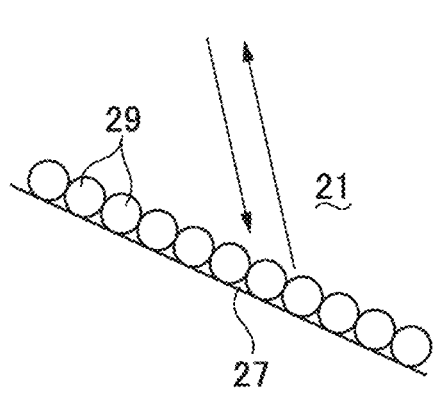
Figure 8C:
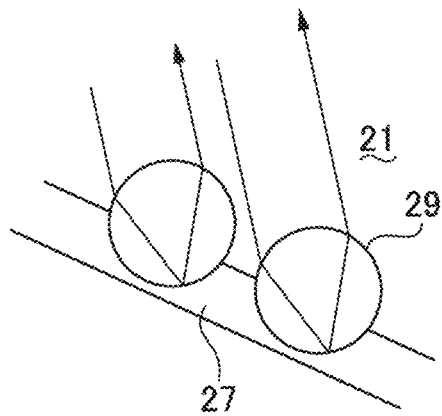

FIGS. 8A to 8C are explanatory views showing an indication member used in the position detection system 1 according to the first embodiment of the invention. FIG. 8A is an explanatory view showing the use mode or the like of the indication member, FIG. 8B is an explanatory view showing an example of a retroreflective portion, and FIG. 8C is an explanatory view showing the principle of retroreflection.

In the position detection system 1 according to the present embodiment, the rod-shaped indication member 20 shown in FIG. 8A is used as the target object Ob. A user holds a base end of the indication member 20 to indicate a predetermined position with its distal end. In the present embodiment, the indication member 20 includes a round bar shaped shaft portion 25 (a rod) and a spherical body portion 26 (a sphere) provided at the distal end of the shaft portion 25, and the outer diameter of the spherical body portion 26 is larger than that of the shaft portion 25. In the indication member 20, the outer peripheral surface of the spherical body portion 26 and the outer peripheral surface of a shaft end portion 250 of the shaft portion 25 connected to the spherical body portion 26 are a retroreflective portion 21. Moreover, in the shaft portion 25, a portion 251 (a proximal end) connected to the base end of the shaft end portion 250 serving as the retroreflective portion 21 is a light absorbing portion which absorbs infrared light as the detection light L2.

The retroreflective portion 21 has a configuration in which a plurality of transmissive spherical bodies 29, such as glass beads, are fixed on the outer peripheral surface of the spherical body portion 26 and the outer peripheral surface of the shaft end portion 250 using a resin layer 27, for example, as shown in FIG. 8B. The retroreflective portion 21 has a retroreflective property of reflecting incident light in the incidence direction again, as indicated by the arrows, regardless of the incidence angle. More specifically, as shown in FIG. 8C, light incident on the spherical body 29 is reflected in the incidence direction by refraction when the light is incident on the spherical body 29, reflection of the light on the interface between the spherical body 29 and the resin layer 27 within the spherical body 29, and refraction when the light is emitted from the spherical body 29. In the position detection system 1 described with reference to FIGS. 1A to 7, therefore, when the detection light L2 is emitted radially from the light source section 12, the detection light L2 emitted to the indication member 20 (target object Ob) is reflected toward the center PE (radiation center) of the light source section 12 by the retroreflective portion 21 of the indication member 20 wherever the indication member 20 (target object Ob) is located, and is received by the light receiving section 13. In addition, the retroreflective portion 21 may also be formed using hemispherical glass beads, a collection of prism pieces, and the like.

Effects of the Present Embodiment

FIGS. 9A to 9C are explanatory views showing the effects obtained by using the indication member 20 according to the first embodiment of the invention. FIG. 9A is an explanatory view showing a state when using an indication member 20A in a first reference example in which the entire indication member 20A is formed to have a round bar shape and the distal end side of the indication member 20A is a retroreflective portion 21A. FIG. 9B is an explanatory view showing a state when using an indication member 20B in a second reference example in which a spherical body portion 26B is provided at the distal end of a round bar shaped shaft portion 25B and only the spherical body portion 26B is a retroreflective portion 21B. FIG. 9C is an explanatory view showing a state when using the indication member 20 to which the invention is applied. In addition, the case where the indication members 20A, 20B, and 20 are at right angles to the viewing surface 41 is shown in upper half portions of FIGS. 9A to 9C, and the case where the indication members 20A, 20B, and 20 are inclined with respect to the viewing surface 41 is shown in lower half portions of FIGS. 9A to 9C.

As described with reference to FIGS. 1A to 8C, in the optical position detection device 10 used in the position detection system 1 according to the present embodiment, when the light source section 12 emits the detection light L2, the light receiving section 13 receives the detection light L2 (reflected light L3) reflected from the target object Ob located in the emission space of the detection light L2, and the position detecting section 50 detects the position of the target object Ob on the basis of the received light intensity in the light receiving section 13.

Here, the target object Ob is the indication member 20 having the retroreflective portion 21 formed on its outer peripheral surface, as shown in FIGS. 8A to 9C. The retroreflective portion 21 reflects detection light in a direction in which the detection light L2 has been emitted. For this reason, the direction in which the detection light L2 emitted to the target object Ob is reflected is determined regardless of the position of the target object Ob. Therefore, if the light receiving section 13 is disposed in a direction in which the light source section 12 is located as in the present embodiment, the detection light L2 reflected by the indication member 20 reaches the light receiving section 13 with sufficient intensity. In particular, since the light source section 12 is a linear light source section which emits the detection light L2 radially in the present embodiment, the light receiving section 13 is disposed at the radiation center (center PE) of the detection light L2. For this reason, the detection light L2 emitted from the light source section 12 is reflected by the retroreflective portion 21 of the indication member 20, so that retroreflection of the detection light L2 toward the radiation center of the light source section 12 is realized. Therefore, since the detection light L2 reflected from the indication member 20 reaches the light receiving section 13 with sufficient intensity regardless of the position of the target object Ob, the detection accuracy can be improved.

In addition, the indication member 20 according to the present embodiment includes the round bar shaped shaft portion 25 and the spherical body 26 provided at the distal end of the shaft portion 25, and the outer peripheral surface of the spherical body portion 26 is the retroreflective portion 21. For this reason, the projection area of the retroreflective portion 21 is larger than that in the case where the distal end is just a round bar like the indication member 20A shown in FIG. 9A. Therefore, according to the present embodiment, since the light intensity of the reflected light L3 incident on the light receiving section 13 is high, the position detection accuracy is high. Moreover, in the case of the indication member 20A shown in FIG. 9A, when the indication member 20A is inclined, the intermediate position of the round bar portion in the longitudinal direction is erroneously detected as an indication position even though the distal end of the round bar portion is at the indication position. In the case of the indication member 20 according to the present embodiment, however, the spherical body portion 26 located at the distal end has a large projection area, as shown in FIG. 9C. Accordingly, even if the indication member 20 is inclined, the indication position (distal end (spherical body portion 26) of the indication member 20) can be correctly detected regardless of the posture of the indication member 20.

In addition, in the indication member 20 according to the present embodiment, the outer peripheral surface of the spherical body portion 26 and the outer peripheral surface of the shaft end portion 250 of the shaft portion 25 serve as the retroreflective portion 21. For this reason, in order to increase the amount of light incident on the light receiving section 13 only with the spherical body portion 26B (retroreflective portion 21B) like the indication member 20B shown in FIG. 9B, it is necessary to enlarge the spherical body portion 26B. In this case, there is a problem in that the indication position becomes unclear, for example. In the present embodiment, however, since the outer peripheral surface of the shaft end portion 250 connected to the spherical body portion 26 is also the retroreflective portion 21, the amount of light incident on the light receiving section 13 can be increased. Therefore, the position of the distal end of the indication member 20 can be accurately detected.

In addition, when the indication member 20 is close to the light source section 12, the received light intensity in the light receiving section 13 tends to be large, while the detection light L2 is emitted to a narrow region of the retroreflective portion 21 since the detection light L2 is emitted to only the distal end side of the spherical body portion 26. In contrast, when the indication member 20 is far from the light source section 12, the received light intensity in the light receiving section 13 tends to be small, while the detection light L2 is emitted to a wide region from the distal end side to the base end side of the indication member 20. As a result, the detection light L2 is emitted to a wide region of the retroreflective portion 21. Therefore, it is possible to reduce a difference between the amount of detection light L2 reaching the light receiving section 13 when the indication member 20 is close to the light source section 12 and the amount of detection light L2 reaching the light receiving section 13 when the indication member 20 is far from the light source section 12. In this way, it is possible to realize the same detection accuracy in the case where the indication member 20 is close to the light source section 12 and the case where the indication member 20 is far from the light source section 12.

Here, when the indication member 20 is located close to the light source section 12, the effect of the indication member 20 according to the present embodiment is just the same as the indication member 20B shown in FIG. 9B since the detection light L2 is emitted to only the spherical body portion 26 and is not emitted to the shaft end portion 250. When the indication member 20 is located close to the light source section 12, the indication position can be accurately detected since the amount of light incident on the light receiving section 13 is large even if the detection light L2 is not emitted to the shaft end portion 250.

In contrast, when the indication member 20 is located far from the light source section 12, detection light is emitted to both the spherical body portion 26 and the shaft end portion 250 in the present embodiment. In the indication member 20 according to the present embodiment, accordingly, the reflected light L3 from the spherical body portion 26 and the shaft end portion 250 is incident on the light receiving section 13 even if the indication member 20 is located far from the light source section 12, unlike the indication member 20B shown in FIG. 9B. Therefore, according to the present embodiment, since the received light intensity in the light receiving section 13 is high, the indication position can be accurately detected. In this case, if the indication member 20 is inclined, the position of the spherical body portion 26 and the position of the shaft end portion 250 are misaligned. However, since the projection area of the spherical body portion 26 is larger than that of the shaft end portion 250, the detection error is very small.

In addition, in the shaft portion 25 of the indication member 20 according to the present embodiment, the portion 251 connected to the base end of the shaft end portion 250 has a light absorbing property. For this reason, since a reflection region in the indication member 20 can be limited, a detection error when the indication member 20 is inclined can be reduced.

Moreover, in the present embodiment, the position detecting section 50 detects the angular position on the basis of a comparison result of the value of the first driving current supplied to the light source section 12 at the time of the first lighting operation and the value of the second driving current supplied to the light source section 12 at the time of the second lighting operation such that the received light intensity in the light receiving section 13 becomes the same at the time of the first and second lighting operations in the light source section 12. According to this configuration, the detection accuracy is improved in proportion to the received light intensity in the light receiving section 13, unlike the case where the angular position of the target object Ob is detected using the "received light intensity in the light receiving section 13 changes with the position of the target object Ob". Therefore, the effect when the indication member 20 with the retroreflective portion 21 is used is large.

In addition, in the present embodiment, the two light source sections 12 are provided, and the light receiving section 13 is disposed at the radiation center of each of the two light source sections 12. Therefore, in any of the two light source sections, the detection light L2 emitted from the light source section 12 is reflected by the retroreflective portion 21 of the indication member 20, so that retroreflection of the detection light L2 toward the radiation center of the light source section 12 is realized. Therefore, since detection light reflected from the indication member 20 reaches the light receiving section 13 with sufficient intensity regardless of the position of the target object Ob, the detection accuracy can be improved.

In addition, the detection light L2 is not visible since the detection light L2 is infrared light. Therefore, there is an advantage in that the detection light L2 does not interrupt viewing of information even when the information is displayed on the viewing surface 41.

Second Embodiment

FIGS. 10A to 10C are explanatory views of an indication member 20 used in a position detection system 1 according to a second embodiment of the invention. FIG. 10A is an explanatory view schematically showing the distal end side of the indication member 20, FIG. 10B is an explanatory view showing a state where the indication member 20 is close to the light source section 12, and FIG. 10C is an explanatory view showing a state where the indication member 20 is far from the light source section 12. In addition, since the basic configuration of the indication member 20 or the basic configuration of the position detection system 1 and the optical position detection device 10 in the present embodiment and the third to sixth embodiments, which will be described later, are the same as that in the first embodiment, the same components are denoted by the same reference numerals, and a duplicate explanation thereof will be omitted.

As shown in FIG. 10A, the indication member 20 according to the present embodiment also includes a round bar shaped shaft portion 25 and a spherical body portion 26 provided at the distal end of the shaft portion 25 and the outer peripheral surface of the spherical body portion 26 and the outer peripheral surface of the shaft end portion 250 serve as a retroreflective portion 21, in the same manner as in the first embodiment. In the retroreflective portion 21, the degree of retroreflection increases continuously or stepwise from the distal end side toward the base end side in the spherical body portion 26 and the shaft end portion 250. In the present embodiment, the degree of retroreflection increases stepwise from the distal end side toward the base end side in the spherical body portion 26 and the shaft end portion 250.

Accordingly, as shown in FIG. 10B, when the indication member 20 is close to the light source section 12, the received light intensity in the light receiving section 13 tends to be large, while the detection light L2 is emitted to only the distal end side of the retroreflective portion 21 with a low degree of retroreflection. In contrast, as shown in FIG. 10C, when the indication member 20 is far from the light source section 12, the received light intensity in the light receiving section 13 tends to be small, while the detection light L2 is emitted up to a portion of the retroreflective portion 21 with a high degree of retroreflection. Therefore, it is possible to reduce a difference between the amount of detection light L2 reaching the light receiving section 13 when the indication member 20 is close to the light source section 12 and the amount of detection light L2 reaching the light receiving section 13 when the indication member 20 is far from the light source section 12. In this way, it is possible to realize the same detection accuracy in the case where the indication member 20 is close to the light source section 12 and the case where the indication member 20 is far from the light source section 12.

Third Embodiment

Figure 11:
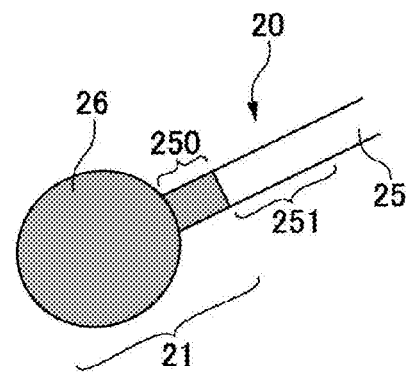
FIG. 11 is an explanatory view of an indication member used in a position detection system according to a third embodiment of the invention.

FIG. 11 is an explanatory view of an indication member 20 used in a position detection system 1 according to a third embodiment of the invention. As shown in FIG. 11, the indication member 20 according to the present embodiment also includes a round bar shaped shaft portion 25 and a spherical body portion 26 provided at the distal end of the shaft portion 25 and the outer peripheral surface of the spherical body portion 26 and the outer peripheral surface of the shaft end portion 250 serve as a retroreflective portion 21, in the same manner as in the first embodiment.

Here, the length of the shaft end portion 250 is shorter than the diameter of the spherical body portion 26. For this reason, even if the indication member 20 is located far from the light source section 12 and the indication member 20 is inclined in a state where detection light is emitted to the spherical body portion 26 and the shaft end portion 250 as shown in FIG. 9C, it is possible to reduce a detection error caused by misalignment between the position of the spherical body portion 26 and the position of the shaft end portion 250.

Fourth Embodiment

Figure 12A:
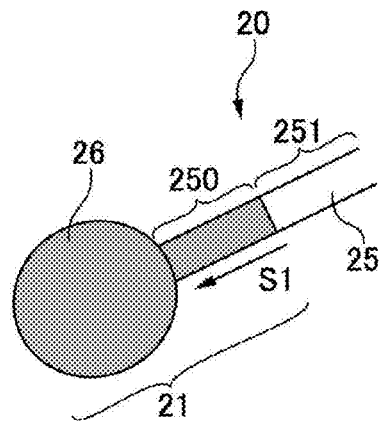
FIGS. 12A and 12B are explanatory views of an indication member used in a position detection system according to a fourth embodiment of the invention.
Figure 12B:
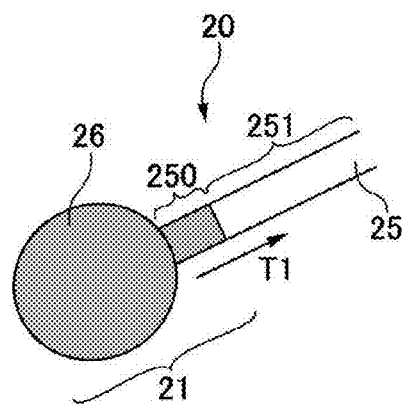

FIGS. 12A and 12B are explanatory views of an indication member 20 used in a position detection system 1 according to a fourth embodiment of the invention. FIG. 12A is an explanatory view when the shaft end portion 250 is long, and FIG. 12B is an explanatory view when the shaft end portion 250 is short. As shown in FIG. 12A, the indication member 20 according to the present embodiment also includes a round bar shaped shaft portion 25 and a spherical body portion 26 provided at the distal end of the shaft portion 25 and the outer peripheral surface of the spherical body portion 26 and the outer peripheral surface of the shaft end portion 250 serve as a retroreflective portion 21, in the same manner as in the first embodiment.

Here, the shaft end portion 250 can move into the spherical body portion 26, as indicated by the arrow S1. Accordingly, the exposure area of the shaft end portion 250 can be changed. For example, when a position near the light source section 12 is indicated by the indication member 20, the shaft end portion 250 can be made to move into the spherical body portion 26 as indicated by the arrow S1, so that the exposure area (length) of the shaft end portion 250 can be narrowed as shown in FIG. 12B. In addition, when a position far from the light source section 12 is indicated by the indication member 20, the shaft end portion 250 can be pulled out from the spherical body portion 26 as indicated by the arrow T1, so that the exposure area (length) of the shaft end portion 250 can be increased as shown in FIG. 12A. Therefore, even if the indication member 20 is inclined, it is possible to reduce a detection error caused by misalignment between the position of the spherical body portion 26 and the position of the shaft end portion 250.

Fifth Embodiment

Figure 13A:
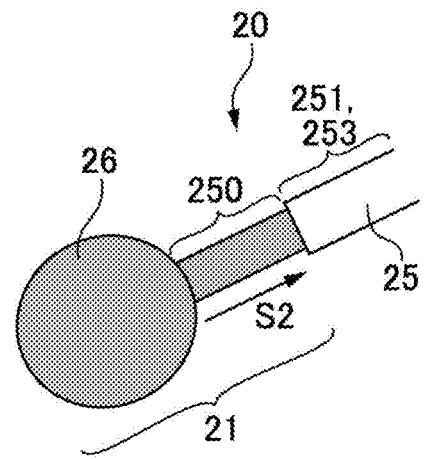
FIGS. 13A and 13B are explanatory views of an indication member used in a position detection system according to a fifth embodiment of the invention.
Figure 13B:
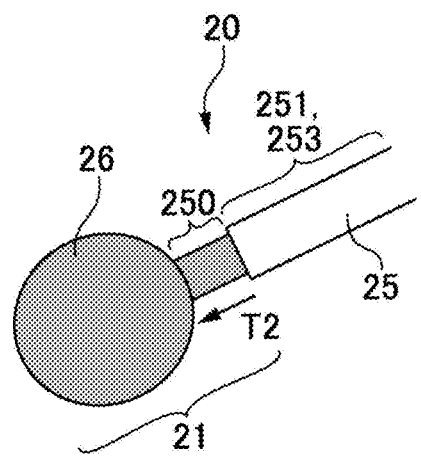

FIGS. 13A and 13B are explanatory views of an indication member 20 used in a position detection system 1 according to a fifth embodiment of the invention. FIG. 13A is an explanatory view when the shaft end portion 250 is long, and FIG. 13B is an explanatory view when the shaft end portion 250 is short. As shown in FIG. 13A, the indication member 20 according to the present embodiment also includes a round bar shaped shaft portion 25 and a spherical body portion 26 provided at the distal end of the shaft portion 25 and the outer peripheral surface of the spherical body portion 26 and the outer peripheral surface of the shaft end portion 250 serve as a retroreflective portion 21, in the same manner as in the first embodiment.

Here, a portion 251 of the shaft portion 25 connected to the base end of the shaft end portion 250 is a cylindrical portion 253 (a sleeve) with an inner diameter slightly larger than the outer diameter of the shaft end portion 250. Accordingly, the shaft end portion 250 can move into the cylindrical portion 253, as indicated by the arrow S2. In this way, the exposure area of the shaft end portion 250 can be changed. For example, when a position near the light source section 12 is indicated by the indication member 20, the shaft end portion 250 can be made to move into the cylindrical portion 253 as indicated by the arrow S2, so that the exposure area (length) of the shaft end portion 250 can be narrowed as shown in FIG. 13B. In addition, when a position far from the light source section 12 is indicated by the indication member 20, the shaft end portion 250 can be pulled out from the cylindrical portion 253 as indicated by the arrow T2, so that the exposure area (length) of the shaft end portion 250 can be increased as shown in FIG. 13A. Therefore, even if the indication member 20 is inclined, it is possible to reduce a detection error caused by misalignment between the position of the spherical body portion 26 and the position of the shaft end portion 250.

Sixth Embodiment

Figure 14A:
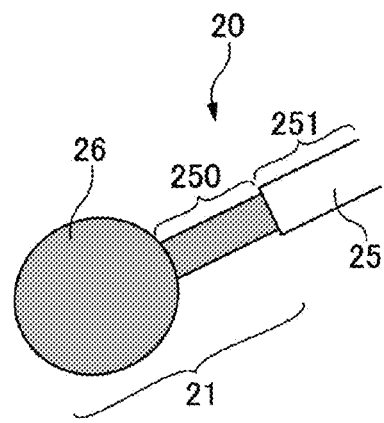
FIGS. 14A to 14D are explanatory views of an indication member used in a position detection system according to a sixth embodiment of the invention.
Figure 14B:
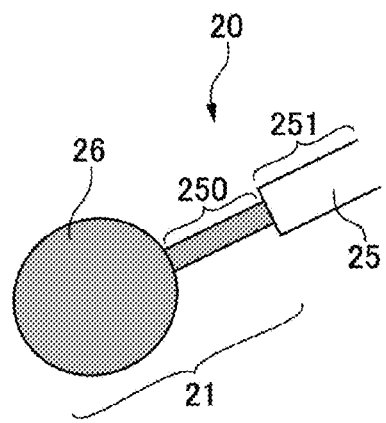
Figure 14C:
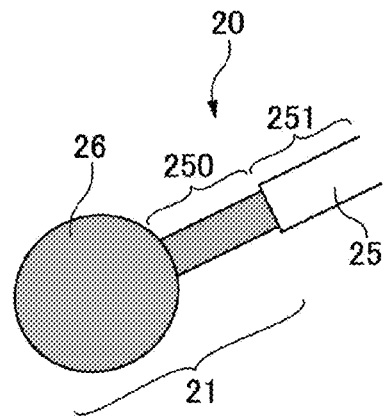
Figure 14D:
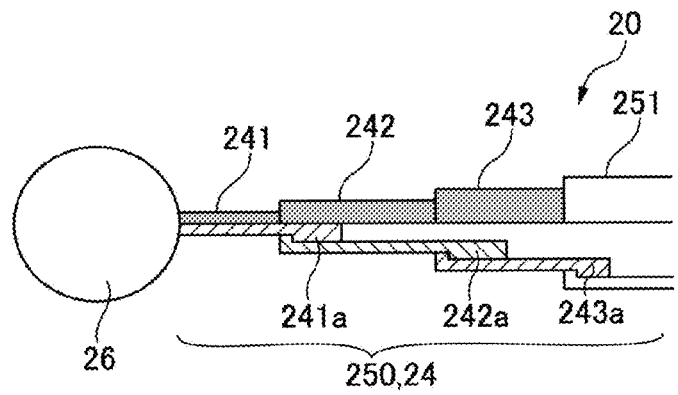

FIGS. 14A to 14D are explanatory views of an indication member 20 used in a position detection system 1 according to a sixth embodiment of the invention. FIG. 14A is an explanatory view when the thickness of the shaft end portion 250 is moderate, FIG. 14B is an explanatory view when the shaft end portion 250 is thin, FIG. 14C is an explanatory view when the shaft end portion 250 is thick, and FIG. 14D is an explanatory view showing the internal structure of the shaft end portion 250. As shown in FIG. 14A, the indication member 20 according to the present embodiment also includes a round bar shaped shaft portion 25 and a spherical body portion 26 provided at the distal end of the shaft portion 25 and the outer peripheral surface of the spherical body portion 26 and the outer peripheral surface of the shaft end portion 250 serve as a retroreflective portion 21, in the same manner as in the first embodiment.

Here, the indication member 20 may be selectively used between a state where the shaft end portion 250 is made thin as shown in FIG. 14B and a state where the shaft end portion 250 is made thick as shown in FIG. 14C. Therefore, the indication member 20 can be used by changing the amount of retroreflection of the indication member 20 according to the distance from the light source section 12 or the like. For example, such a configuration may be realized by forming the shaft end portion 250 using an extension and contraction portion (a telescopic portion) in which a plurality of cylindrical portions with different diameters are provided and by making the outer peripheral surfaces of the plurality of cylindrical portions serve as the retroreflective portion 21. More specifically, as shown in FIG. 14D, the shaft end portion 250 is an extension and contraction portion 24 in which a thin shaft portion 241 and a plurality of cylindrical portions 242 and 243 with different diameters are provided, and the outer peripheral surfaces of the thin shaft portion 241 and the cylindrical portions 242 and 243 become the retroreflective portion 21. In addition, the diameter of the thin shaft portion 241, the diameters of the cylindrical portions 242 and 243, and the diameter of the cylindrical portion 251 connected to the base end of the shaft end portion 250 satisfy the following relationships.

Outer diameter of the thin shaft portion 241<Inner diameter of the cylindrical portion 242

Outer diameter of the cylindrical portion 242<Inner diameter of the cylindrical portion 243

Outer diameter of the cylindrical portion 243<Inner diameter of the portion 251 connected to the shaft end portion 250

Here, large-diameter portions 241a, 242a, and 243a are provided on the base end sides of the thin shaft portion 241 and the cylindrical portions 242 and 243, respectively, and convex portions for slip prevention in which the large-diameter portions 241a, 242a, and 243a of the thin shaft portion 241 and the cylindrical portions 242 and 243 are retained are provided on the distal end sides of the cylindrical portions 242 and 243 and the connected portion 251.

According to such a configuration, the diameter of the shaft end portion 250 can be changed as shown in FIGS. 14A to 14C by exposing any of the thin shaft portion 241 and the cylindrical portions 242 and 243. In addition, the length of the shaft end portion 250 can also be changed by exposing any of the thin shaft portion 241 and the cylindrical portions 242 and 243.

Seventh Embodiment

Figure 15:
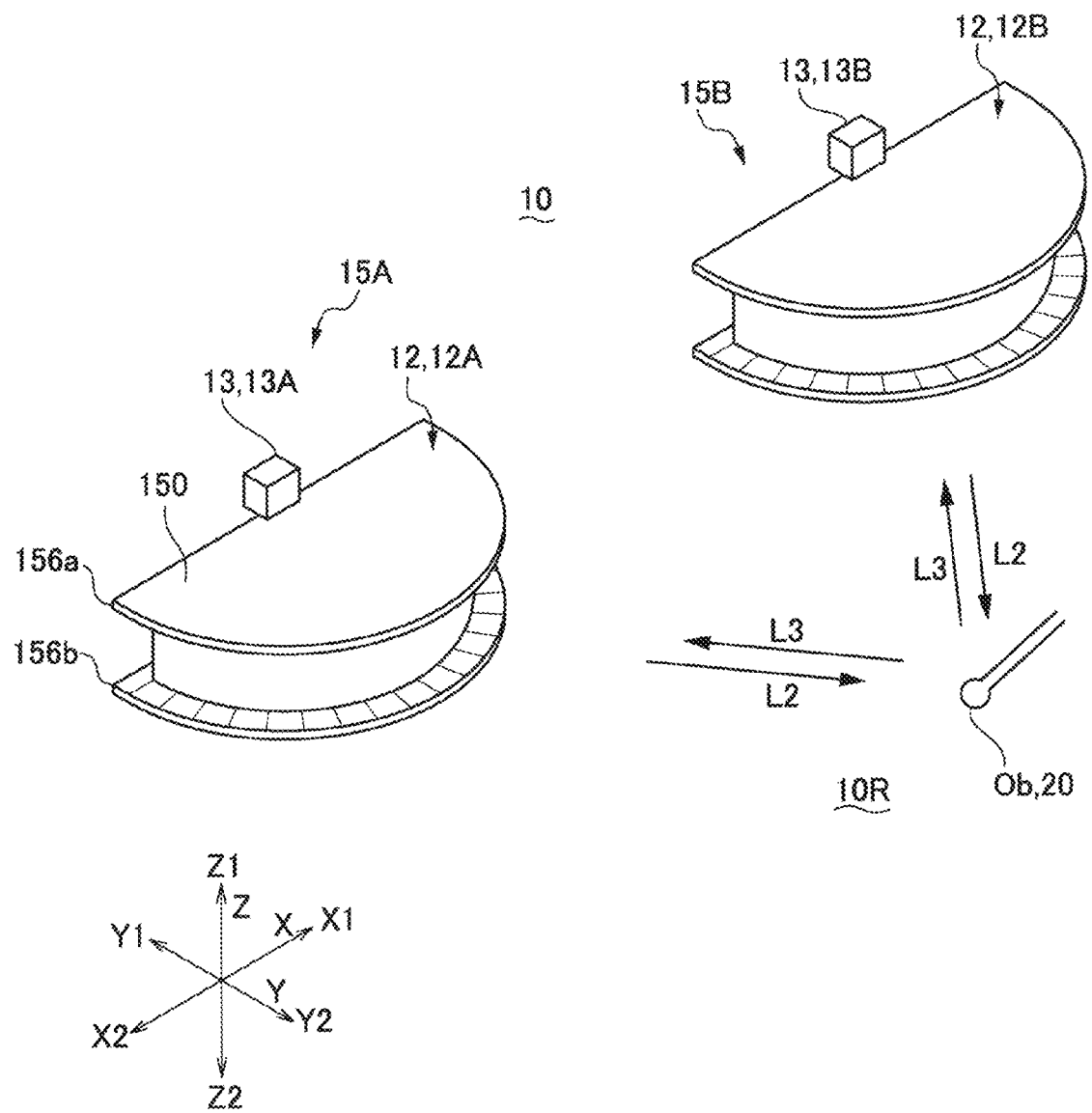
FIG. 15 is an explanatory view of a light emission and reception unit of an optical position detection device used in a position detection system according to a seventh embodiment of the invention.
Figure 16:
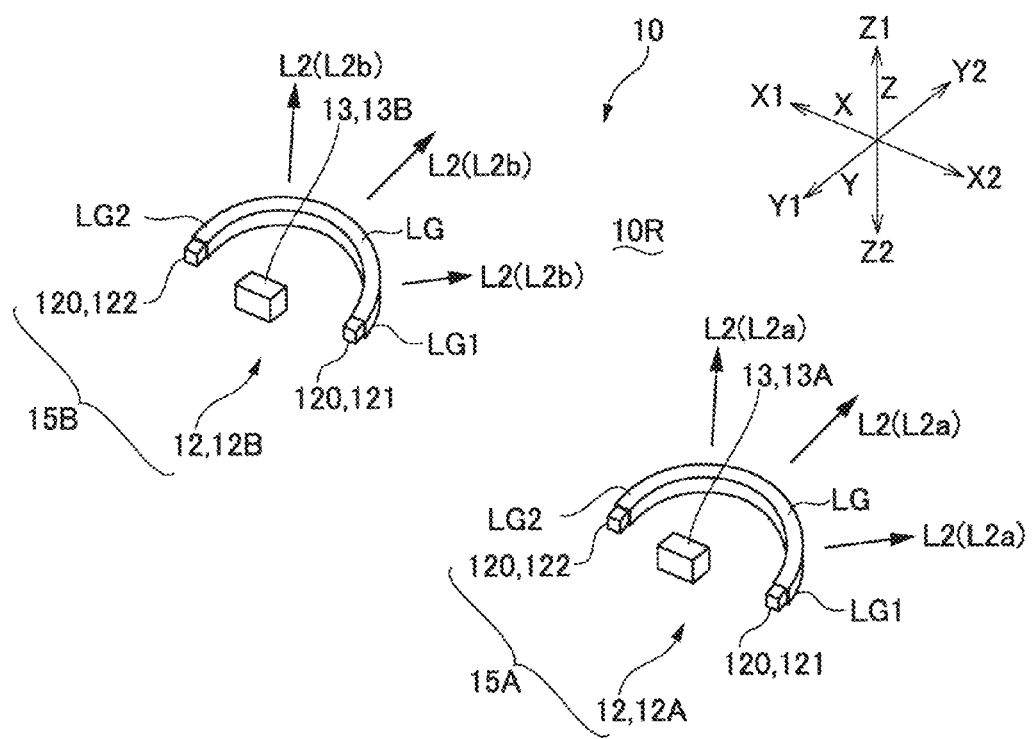
FIG. 16 is an explanatory view showing the configuration of sections of the light emission and reception unit shown in FIG. 15.

FIG. 15 is an explanatory view of a light emission and reception unit of the optical position detection device 10 used in the position detection system 1 according to a seventh embodiment of the invention. FIG. 16 is an explanatory view showing the configuration of sections of the light emission and reception unit shown in FIG. 15. In addition, since the basic configuration in the present embodiment is the same as that in the first embodiment, the same components are denoted by the same reference numerals, and a duplicate explanation thereof will be omitted.

Although each of the two light source sections 12 (first and second light source sections 12A and 12B) is configured to include the first and second light source modules 126 and 127 disposed so as to overlap each other in the Z-axis direction in the first embodiment, each of the two light source sections 12 (first and second light source sections 12A and 12B) is configured to include one light source module in the form shown in FIGS. 15 and 16. That is, in both the two light source sections 12 (first and second light source sections 12A and 12B), the light source 120 (first and second light sources 121 and 122) is disposed at each of one and the other ends LG1 end LG2 of one light guide LG. The other configuration is the same as that in the first embodiment.

Also in such a configuration, it is possible to form the first light intensity distribution LID1 shown in FIGS. 4A and 6A by turning on the first light source 121 at the time of the first lighting operation and to form the second light intensity distribution LID2 shown in FIGS. 4B and 6A by turning on the second light source 122 at the time of the second lighting operation.

Moreover, in the form shown in FIGS. 15 and 16, if the light receiving section 13 is provided at the center PE of the light source section 12, the incidence of the detection light L2 on the light receiving section 13 is interrupted by the light source section 12. Also in such a configuration, it is possible to make the detection light L2 reflected from the retroreflection portion 21 incident on the light receiving section 13 with sufficient intensity by providing the light receiving section 13 at the position (radiation center position) which overlaps the center PE of the light source section 12 in the Z-axis direction.

Eighth Embodiment

Figure 17:
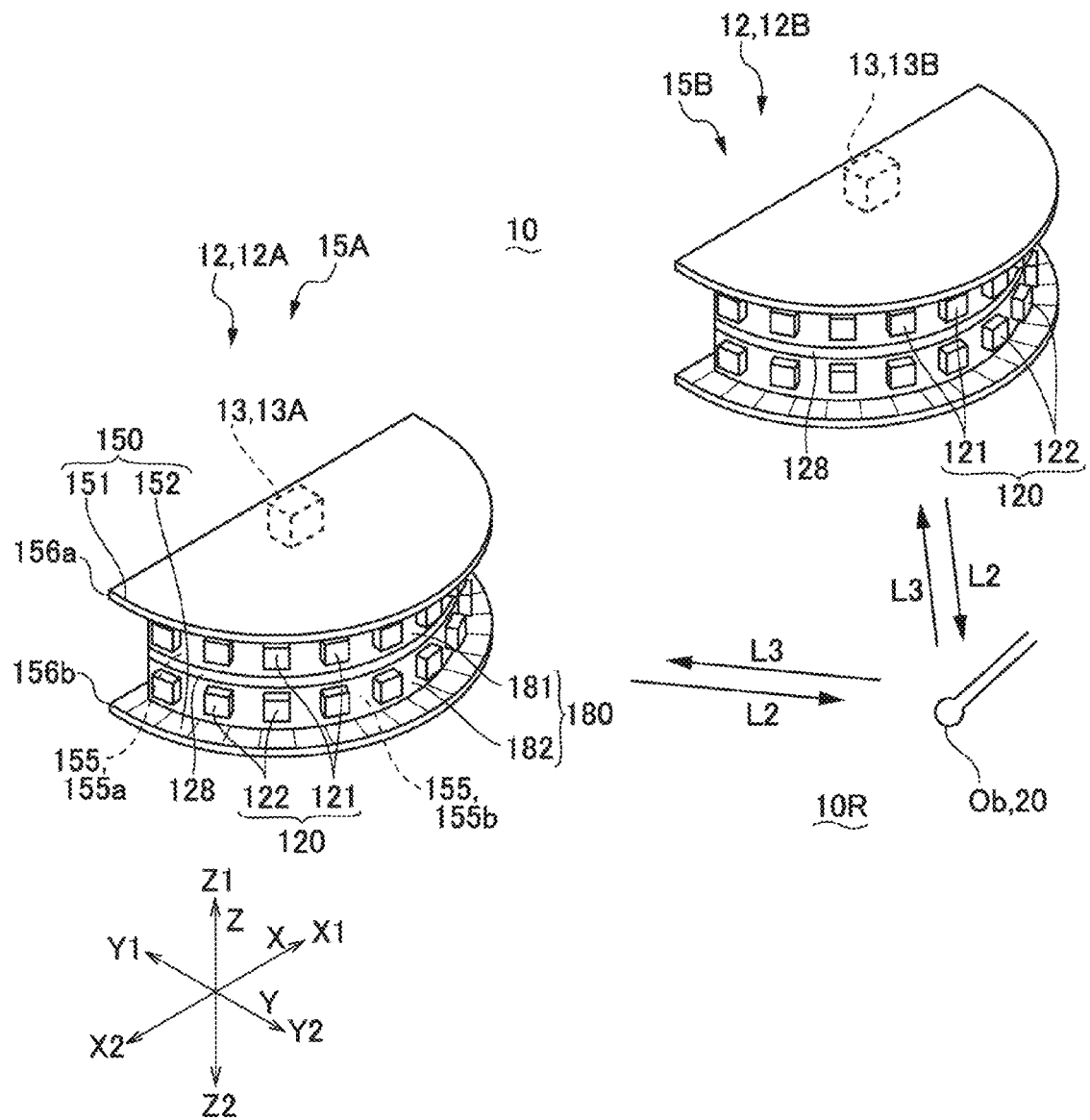
FIG. 17 is an explanatory view of a light emission and reception unit of an optical position detection device used in a position detection system according to an eighth embodiment of the invention.
Figure 18A:
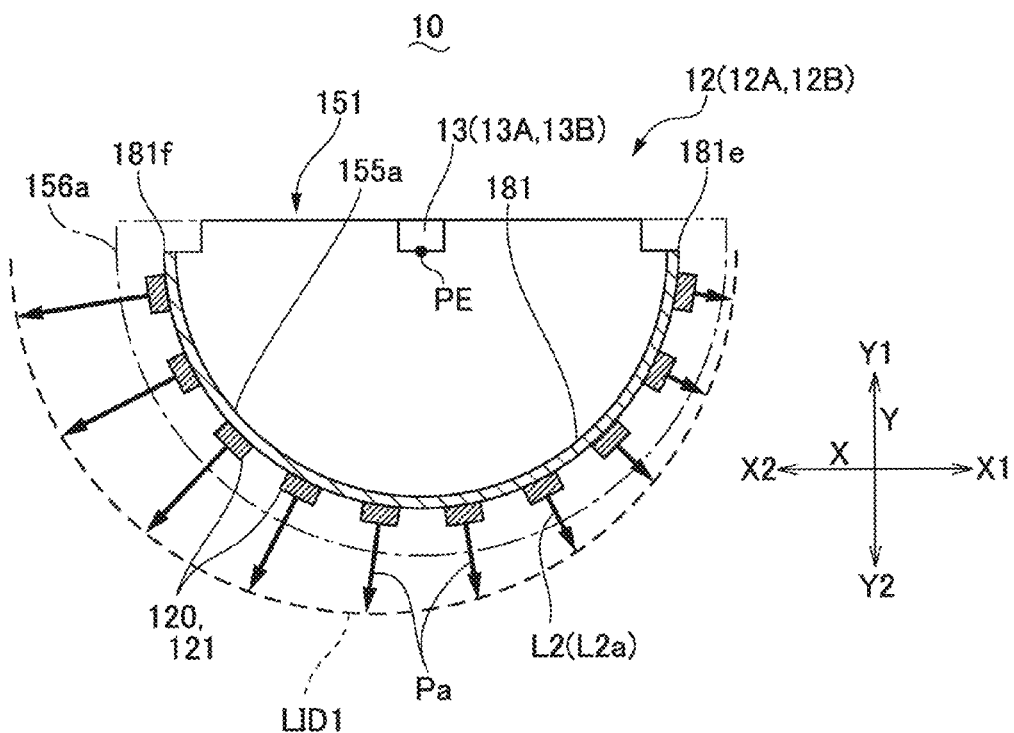
FIGS. 18A and 18B are explanatory views of a light source section provided in the light emission and reception unit shown in FIG. 17.
Figure 18B:
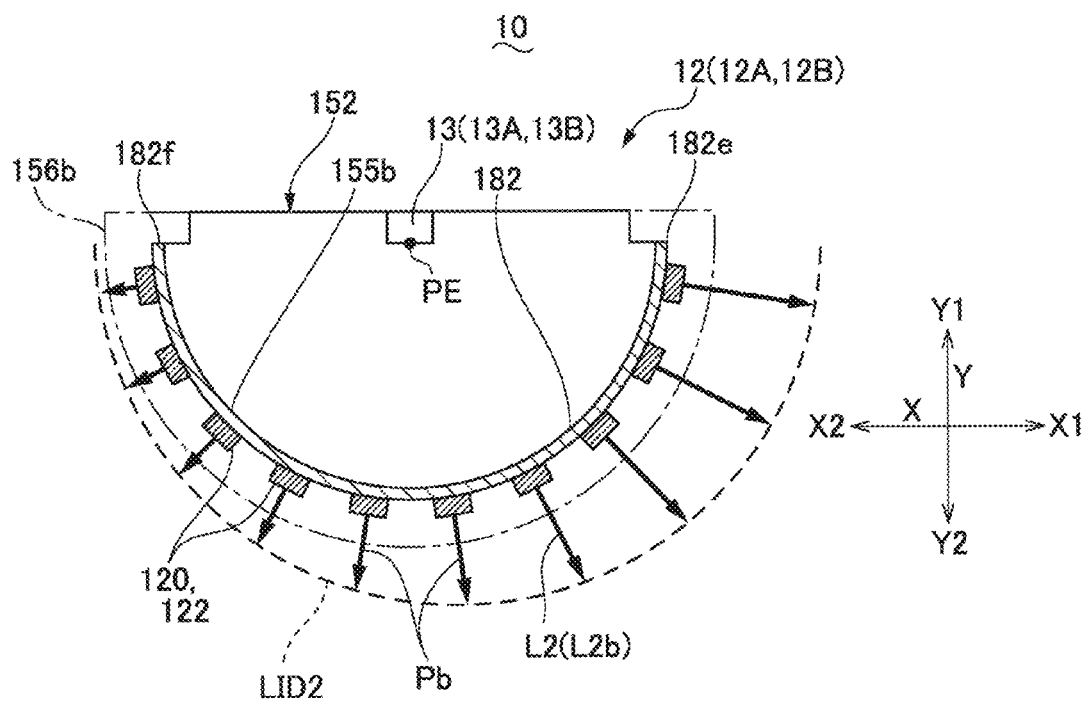

FIG. 17 is an explanatory view of a light emission and reception unit of the optical position detection device 10 used in the position detection system 1 according to an eighth embodiment of the invention. FIGS. 18A and 18B are explanatory views of a light source section provided in the light emission and reception unit shown in FIG. 17. In addition, since the basic configuration in the present embodiment is the same as that in the first embodiment, the same components are denoted by the same reference numerals, and a duplicate explanation thereof will be omitted.

Although the light guide LG is used in the light source section 12 in the first embodiment, the XY coordinate of the target object Ob is detected in the same principle as the first embodiment without using a light guide in the present embodiment. More specifically, as shown in FIG. 17, each of the light source sections 12 (first and second light source sections 12A and 12B) of the optical position detection device 10 according to the present embodiment includes the plurality of light sources 120 (first and second light sources 121 and 122), a belt-like flexible substrate 180 on which the plurality of light sources 120 are mounted, and the fan-shaped or semicircular light source support member 150 with a convex surface 155 which extends with a shape curved in the longitudinal direction (circumferential direction). In the present embodiment, the convex surface 155 has a shape curved in the arc shape in the longitudinal direction (circumferential direction).

In the present embodiment, a first belt-like flexible substrate 181 and a second belt-like flexible substrate 182 disposed in parallel to the first flexible substrate 181 in the width direction (Z-axis direction) are used as the flexible substrate 180. On the first flexible substrate 181, the plurality of first light sources 121 are mounted as the plurality of light sources 120 in the longitudinal direction of the first flexible substrate 181. On the second flexible substrate 182, the plurality of second light sources 122 are mounted as the plurality of light sources 120 in the longitudinal direction of the second flexible substrate 182. LEDs are used as the light sources 120.

In addition, also in the two light source sections 12 (first and second light source sections 12A and 12B), the light source support member 150 has a structure in which the first and second light source support members 151 and 152 overlap each other in the Z-axis direction, and the first and second light source support members 151 and 152 are symmetrical in the Z-axis direction. The first light source support member 151 includes an arc-shaped convex surface 155a, which forms an upper half portion of the convex surface 155, and a fan-shaped or semicircular flange 156a protruding from the convex surface 155a at the opposite end to a side where the second light source support member 152 is located on the convex surface 155a. The first flexible substrate 181 is disposed on the convex surface 155a so as to overlap each other. The second light source support member 152 includes an arc-shaped convex surface 155b, which forms a lower half portion of the convex surface 155, and a fan-shaped or semicircular flange 156b protruding from the convex surface 155b at the opposite end to a side where the first light source support member 151 is located on the convex surface 155b. The second flexible substrate 182 is disposed on the convex surface 155b so as to overlap each other. Here, a portion interposed in the Z-axis direction by the first and second flexible substrates 181 and 182 is the transmissive light guide section 128, and the light receiving section 13 including a photodiode is disposed at the back of the light guide section 128.

In order to detect the position of the target object Ob in the space to be detected 10R in the optical position detection device 10 configured as described above, the plurality of first light sources 121 mounted on the first flexible substrate 181 and the plurality of second light sources 122 mounted on the second flexible substrate 182 are lit at different timings. In this case, in the first lighting operation in which all of the plurality of first light sources 121 are lit and all of the plurality of second light sources 122 are turned off, the emission intensity of the first light source 121 is decreased from the side, at which one end 181f of the first flexible substrate 181 in the longitudinal direction is located, toward the side, at which the other end 181e of the first flexible substrate 181 is located, as shown by the arrow Pa indicating the level of the emission intensity in FIG. 18A. Accordingly, in the first light intensity distribution LID1 of the detection light L2 emitted to the space to be detected 10R, the light intensity is high in the angular direction in which the one end 181f of the first flexible substrate 181 in the longitudinal direction is located, and the light intensity is continuously decreased from there toward the angular direction in which the other end 181e is located.

On the other hand, in the second lighting operation in which all of the plurality of second light sources 122 are lit and all of the plurality of first light sources 121 are turned off, the emission intensity of the second light source 122 is increased from the side, at which one end 182f of the second flexible substrate 182 in the longitudinal direction is located, toward the side, at which the other end 182e of the second flexible substrate 182 is located, as shown by the arrow Pb indicating the level of the emission intensity in FIG. 18B. Accordingly, in the second light intensity distribution LID2 of the detection light L2 emitted to the space to be detected 10R, the light intensity is high in the angular direction in which the end 182e at the other side of the second flexible substrate 182 in the longitudinal direction is located, and the light intensity is continuously decreased from there toward the angular direction in which the end 182f at the one side is located.

Therefore, if the first and second lighting operations are respectively executed in the first and second light source sections 12A and 12B, the position (XY coordinates) of the target object Ob can be detected in the same principle as in the first embodiment. In this case, it is preferable to detect the angular position of the target object Ob on the basis of the sum (first driving current value) of driving currents supplied to the plurality of first light sources 121 and the sum (second driving current value) of driving currents supplied to the plurality of second light sources 122. In addition, when changing the emission intensities of the plurality of light sources 120, it is preferable to change a driving current every light source 120 using a resistance element or the like. According to the present embodiment, there is an advantage in that detection light can also be emitted to the position, which is spaced apart from the light source section 12, with sufficient intensity.

Ninth Embodiment

Figure 19:
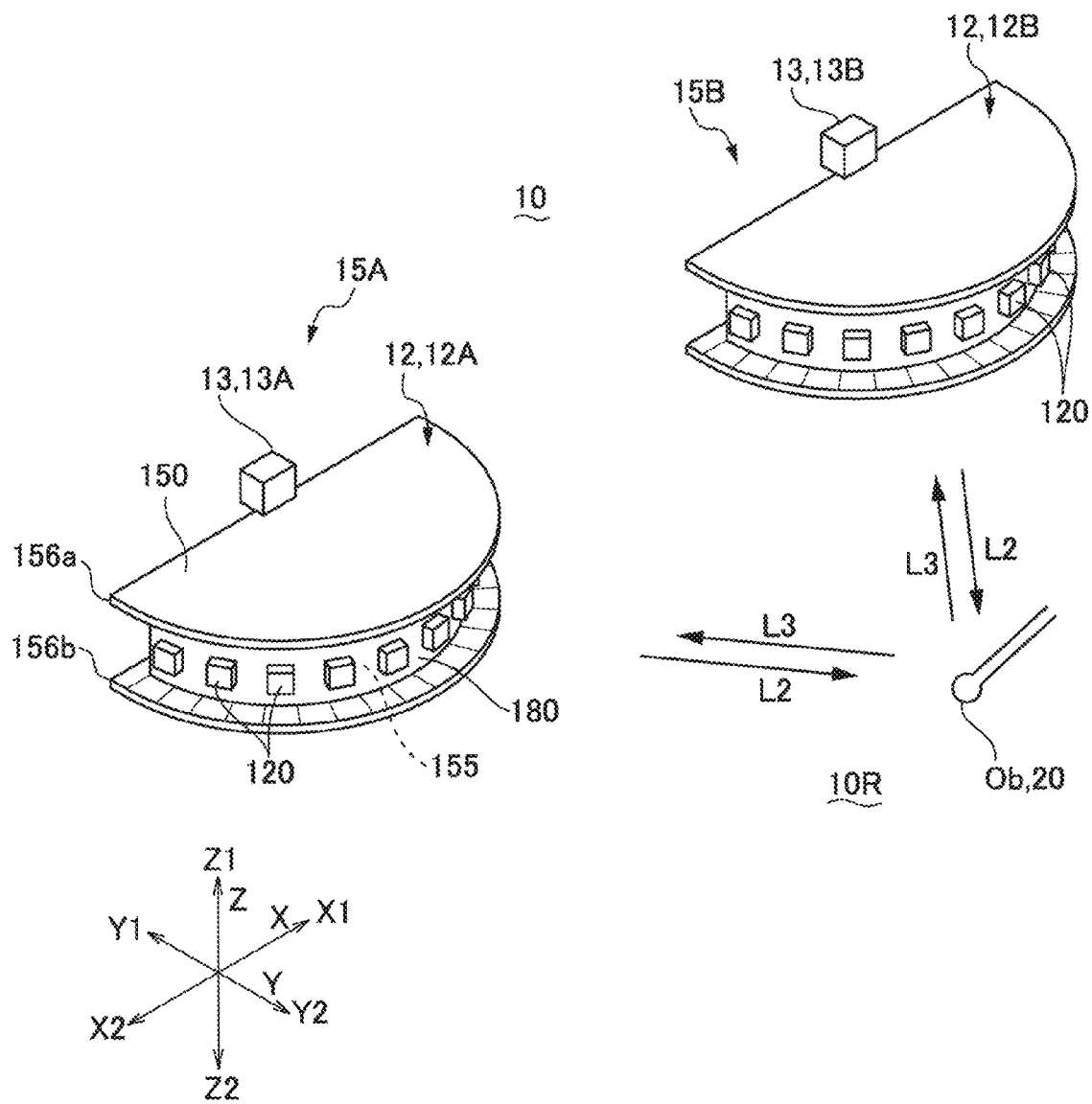
FIG. 19 is an explanatory view of a light emission and reception unit of an optical position detection device used in a position detection system according to a ninth embodiment of the invention.

FIG. 19 is an explanatory view of a light emission and reception unit of the optical position detection device 10 used in the position detection system 1 according to a ninth embodiment of the invention. In addition, since the basic configuration in the present embodiment is the same as that in the seventh embodiment, the same components are denoted by the same reference numerals, and a duplicate explanation thereof will be omitted.

Although the first light source 121 is lit in the first lighting operation and the second light source 122 is lit in the second lighting operation in the eighth embodiment, only one light source 120 is used in the present embodiment as shown in FIG. 19. Also in this configuration, the position (XY coordinates) of the target object Ob can be detected in the same principle as in the first embodiment by changing the driving current supplied to the light source 120 at the time of the first and second lighting operations. That is, in the first lighting operation, the emission intensity of the light source 120 is decreased from the side where one end of the flexible substrate 180 in the longitudinal direction is located toward the side where the other end is located, as shown by the arrow Pa indicating the level of the emission intensity in FIG. 18A. Accordingly, in the first light intensity distribution LID1 of the detection light L2 emitted to the space to be detected 10R, the light intensity is high in the angular direction in which the one end of the flexible substrate 180 in the longitudinal direction is located, and the light intensity is continuously decreased from there toward the angular direction in which the other end is located. Moreover, in the second lighting operation, the emission intensity of the light source 120 is decreased from the side where the other end of the flexible substrate 180 in the longitudinal direction is located toward the side where the one end is located, as shown by the arrow Pb indicating the level of the emission intensity in FIG. 18B. Accordingly, in the second light intensity distribution LID2 of the detection light L2 emitted to the space to be detected 10R, the light intensity is high in the angular direction in which the other end of the flexible substrate 180 in the longitudinal direction is located, and the light intensity is continuously decreased from there toward the angular direction in which the one end is located.

Therefore, if the first and second lighting operations are respectively executed in the first and second light source sections 12A and 12B, the position (XY coordinates) of the target object Ob can be detected in the same principle as in the first embodiment. In this case, it is preferable to detect the angular position of the target object Ob on the basis of the sum (first driving current value) of driving currents supplied to the light sources 120 in the first lighting operation and the sum (first driving current value) of driving currents supplied to the light sources 120 in the second lighting operation.

Moreover, in the form shown in FIGS. 18A and 18B, if the light receiving section 13 is provided at the center PE of the light source section 12, the incidence of the detection light L2 on the light receiving section 13 is interrupted by the light source section 12. Also in such a configuration, it is possible to make the detection light L2 reflected from the retroreflective portion 21 incident on the light receiving section 13 with sufficient intensity by providing the light receiving section 13 at the position (radiation center) which overlaps the center PE of the light source section 12 in the Z-axis direction.

Other Embodiments

The configurations described in the first to ninth embodiments may be combined. In addition, although two light source sections 12 are used in the embodiments described above, the position of the target object Ob may be detected using one light source section 12. In addition, although the light receiving result at the time of the first lighting operation is directly compared with the light receiving result at the time of the second lighting operation in the embodiment described above, it is also possible to provide a reference light source which emits reference light incident on a light receiving section without being transmitted through the space to be detected 10R. In such a configuration, a light receiving result at the time of the first lighting operation is compared with a light receiving result of the reference light, a light receiving result at the time of the second lighting operation is compared with the light receiving result of the reference light, and the light receiving result at the time of the first lighting operation and the light receiving result at the time of the second lighting operation are indirectly compared with each other on the basis of the light receiving result of the reference light. More specifically, a difference between the detection intensity of the detection light L2 (reflected light L3) of the light receiving section 13 at the time of the first lighting operation and the detection intensity of the reference light of the light receiving section 13 is processed as the detection intensity of the light receiving section 13 at the time of the first lighting operation, and a difference between the detection intensity of the detection light L2 (reflected light L3) of the light receiving section 13 at the time of the second lighting operation and the detection intensity of the reference light of the light receiving section 13 is processed as the detection intensity of the light receiving section 13 at the time of the second lighting operation. Such a configuration is advantageous in that the influence of outside light and the like can be offset by the intensity when the reference light is received.

Example of the Configuration of a Position Detection System

First Specific Example of the Position Detection System 1

Figure 20:
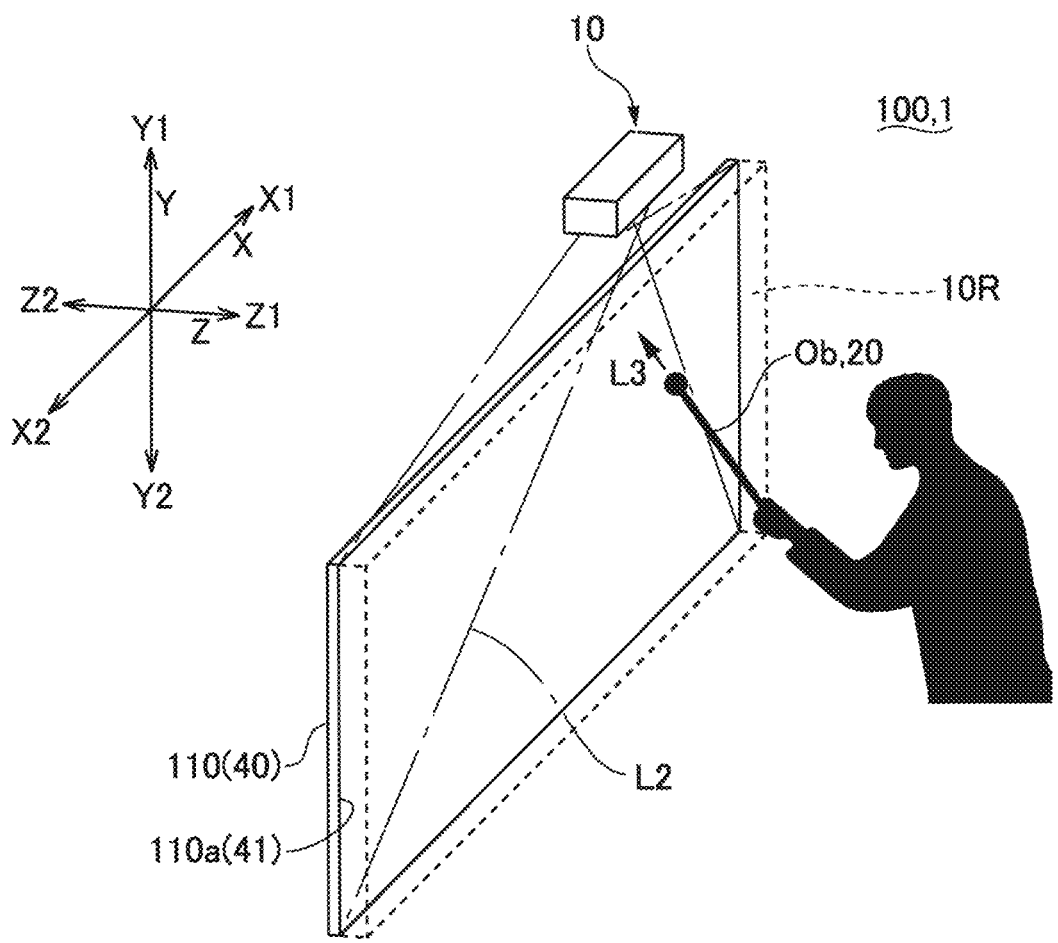
FIG. 20 is an explanatory view of a first specific example (display system with an input function) of a position detection system to which the invention is applied.

FIG. 20 is an explanatory view of a first specific example (display system with an input function) of the position detection system 1 to which the invention is applied. In addition, in the display system with an input function according to the present embodiment, the configuration of the position detection system 1 and the optical position detection device 10 is the same as the configuration described with reference to FIGS. 1A to 19. Accordingly, the same components are denoted by the same reference numerals, and a duplicate explanation thereof will be omitted.

In the position detection system 1 according to the embodiment described above, if a display device 110 is used as the viewing surface forming member 40 and the optical position detection device 10 described with reference to FIGS. 1A to 19 is provided in the display device 110 as shown in FIG. 20, it can be used as a display system with an input function 100, such as an electronic blackboard or a digital signage. Here, the display device 110 is a direct viewing type display device or a rear projection type display device having the viewing surface forming member 40 as a screen.

In the display system with an input function 100, the optical position detection device 10 emits the detection light L2 along a display surface 110a (viewing surface 41) and also detects the detection light L2 (reflected light L3) reflected from the target object Ob (indication member with a retroreflective portion). Accordingly, since the position of the target object Ob can be detected if the target object Ob is brought close to a part of an image displayed on the display device 110, the position of the target object Ob can be used as input information, such as an image switching instruction.

Second Specific Example of the Position Detection System 1

Figure 21:
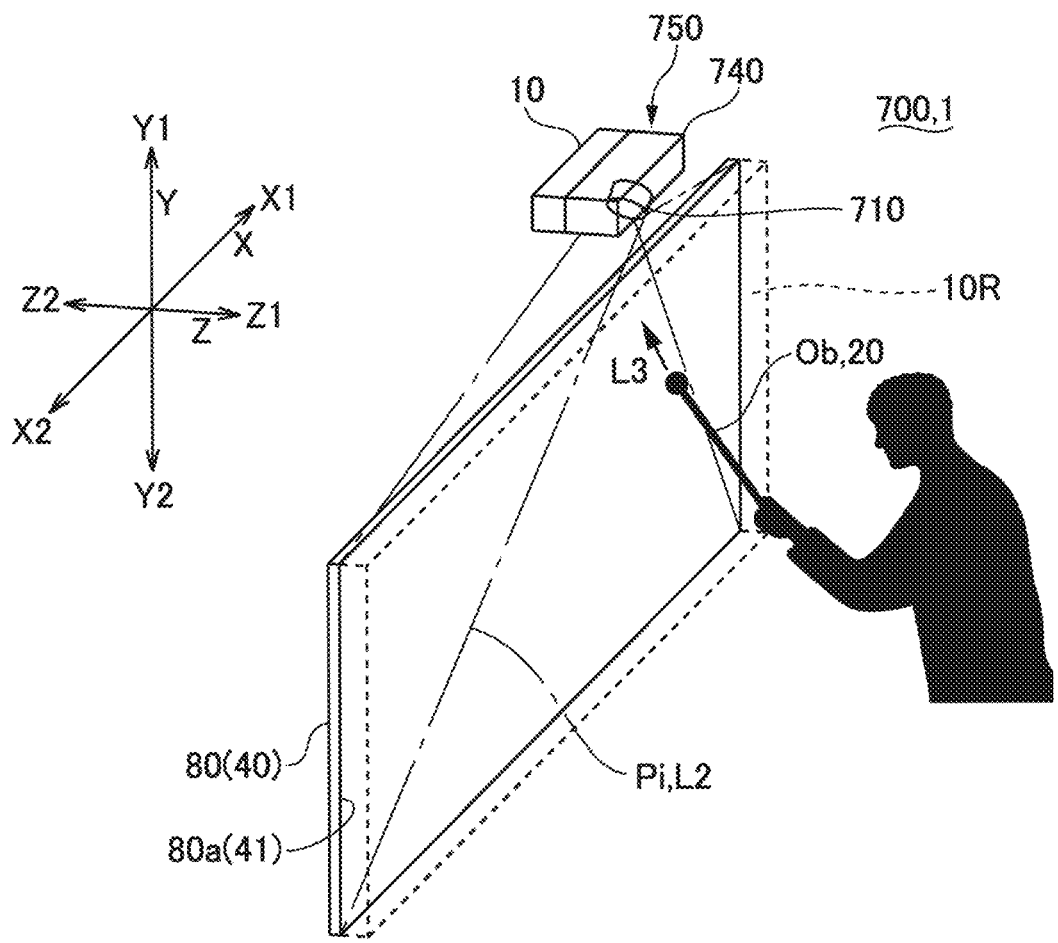
FIG. 21 is an explanatory view of a second specific example (display system with an input function/projection type display system with an input function) of a position detection system to which the invention is applied.

Referring to FIG. 21, an example in which a projection type display system with a position function is formed using a screen as the viewing surface forming member 40 will be described. FIG. 21 is an explanatory view of a second specific example (display system with an input function/projection type display system with an input function) of the position detection system 1 to which the invention is applied. In addition, in the projection type display system with a position function according to the present embodiment, the configuration of the position detection system 1 and the optical position detection device 10 is the same as the configuration described with reference to FIGS. 1A to 19. Accordingly, the same components are denoted by the same reference numerals, and a duplicate explanation thereof will be omitted.

In a projection type display system with an input function 700 (display system with an input function) shown in FIG. 21, an image is projected from an image projection apparatus 750 (image generator), such as an LCD projector or a digital micromirror device, onto a screen 80 (viewing surface forming member 40). In the projection type display system with an input function 700, the image projection apparatus 750 projects image display light Pi from a projector lens system 710, which is provided in a housing 740, toward the screen 80 in an enlarged manner. Here, the image projection apparatus 750 projects the image display light Pi toward the screen 80 from the direction slightly inclined from the Y-axis direction. Therefore, the viewing surface 41 through which the information is viewed is formed by a screen surface 80a of the screen 80 onto which an image is projected.

In the projection type display system with an input function 700, the optical position detection device 10 is added to the image projection apparatus 750 so that they are integrally formed. For this reason, the optical position detection device 10 emits the detection light L2 from a place, which is different from the projector lens system 710, along the screen surface 80a and also detects the reflected light L3 reflected from the target object Ob (indication member with a retroreflective portion). Accordingly, since the position (position in a direction crossing the projection direction/XY coordinates) of the target object Ob can be detected if the target object Ob is brought close to a part of an image projected on the screen 80, the position of the target object Ob can be used as input information, such as an image switching instruction.

In addition, if the optical position detection device 10 and the screen 80 are unified, a screen apparatus with an input function can be formed.

Other Specific Examples of the Position Detection System 1

In the invention, it is possible to adopt a configuration in which the viewing surface forming member 40 is a light transmissive member that covers an exhibit. In this case, the viewing surface 41 is a surface, on which the exhibit is viewed, at the opposite side to the side where the exhibit is disposed in the light transmissive member. Through such a configuration, it is possible to form a window system with an input function or the like.

In addition, it is possible to adopt a configuration in which the viewing surface forming member 40 is a base that supports a mobile medium for games. In this case, the viewing surface 41 is a surface of the base located at the side where the relative position of the base and the medium for games is viewed. According to this configuration, amusement machines, such as a pachinko machine and a coin-operated game, can be formed as an amusement system with an input function and the like.

The entire disclosure of Japanese Patent Application No. 2011-145371 filed Jun. 30, 2011 is expressly incorporated by reference herein.

What is claimed is:

1. An indication member comprising:
a round bar shaped shaft; and
a spherical body provided at a distal end of the shaft,
wherein an outer peripheral surface of the spherical body and an outer peripheral surface of a shaft end portion of the shaft connected to the spherical body are a retroreflective portion, and
wherein a degree of retroreflection of the retroreflective portion increases from a distal end side toward a base end side of the spherical body and the shaft end.

2. The indication member according to claim 1,
wherein a length of the shaft end portion is less than a diameter of the spherical body.

3. The indication member according to claim 1,
wherein the shaft end portion is movable into the spherical body.

4. The indication member according to claim 1,
wherein the shaft end portion is movable into a cylinder of the shaft.

5. The indication member according to claim 1,
wherein the shaft end portion includes a plurality of extendible cylindrical portions with different diameters, and
outer peripheral surfaces of the plurality of cylindrical portions are retroreflective.

6. The indication member according to claim 1,
wherein a portion of the shaft adjacent a base end side of the shaft end portion has a light absorbing property.

7. An optical position detection device that selectively detects the indication member according to claim 1, comprising:
a light source section that emits detection light;
a light receiving section that receives the detection light reflected by the retroreflective portion of the indication member located in an emission space of the detection light; and
a position detecting section that detects a position of the indication member based on a received light intensity at the light receiving section.

8. An optical position detection device that selectively detects the indication member according to claim 1, comprising: a light source section that emits detection light; a light receiving section that receives the detection light reflected by the retroreflective portion of the indication member located in an emission space of the detection light; and a position detecting section that detects a position of the indication member based on a received light intensity at the light receiving section.

9. The optical position detection device according to claim 7,
wherein the light source section performs a first lighting operation, in which an emission intensity of the detection light decreases from one side toward an other side of the emission space, and a second lighting operation, in which the emission intensity of the detection light decreases from the other side toward the one side in a different period, and
the position detecting section detects the position of the indication member based on a comparison result of the received light intensity in the light receiving section at a time of the first lighting operation and the received light intensity in the light receiving section at a time of the second lighting operation.

10. The optical position detection device according to claim 8,
wherein the light source section performs a first lighting operation, in which an emission intensity of the detection light decreases from one side toward an other side of the emission space, and a second lighting operation, in which the emission intensity of the detection light decreases from the other side toward the one side in a different period, and
the position detecting section detects the position of the indication member based on a comparison result of the received light intensity in the light receiving section at a time of the first lighting operation and the received light intensity in the light receiving section at a time of the second lighting operation.

11. The optical position detection device according to claim 9,
wherein the position detecting section detects the position of the indication member based on a comparison result of a value of a first driving current supplied to the light source section at a time of the first lighting operation and a value of a second driving current supplied to the light source section at a time of the second lighting operation when the received light intensity in the light receiving section at the time of the first lighting operation becomes equal to the received light intensity in the light receiving section at the time of the second lighting operation.

12. The optical position detection device according to claim 10,
wherein the position detecting section detects the position of the indication member based on a comparison result of a value of a first driving current supplied to the light source section at a time of the first lighting operation and a value of a second driving current supplied to the light source section at a time of the second lighting operation when the received light intensity in the light receiving section at the time of the first lighting operation becomes equal to the received light intensity in the light receiving section at the time of the second lighting operation.

13. A display system with an input function comprising:
the optical position detection device according to claim 7; and
a display device with a display surface on which an image is displayed,
wherein the image is changed based on a detection result of the optical position detection device regarding a position of the indication member in a direction along the display surface.

14. A display system with an input function comprising:
the optical position detection device according to claim 9; and
a display device with a display surface on which an image is displayed,
wherein the image is changed based on a detection result of the optical position detection device regarding a position of the indication member in a direction along the display surface.

15. A display system with an input function comprising:
the optical position detection device according to claim 11; and
a display device with a display surface on which an image is displayed,
wherein the image is changed based on a detection result of the optical position detection device regarding a position of the indication member in a direction along the display surface.

16. A display system with an input function comprising:
the optical position detection device according to claim 7; and
an image projection apparatus that projects an image,
wherein the image is changed based on a detection result of the optical position detection device regarding a position of the indication member in a direction crossing a projection direction of the image.

17. A display system with an input function comprising:
the optical position detection device according to claim 9; and
an image projection apparatus that projects an image,
wherein the image is changed based on a detection result of the optical position detection device regarding a position of the indication member in a direction crossing a projection direction of the image.

18. A display system with an input function comprising:
the optical position detection device according to claim 11; and
an image projection apparatus that projects an image,
wherein the image is changed based on a detection result of the optical position detection device regarding a position of the indication member in a direction crossing a projection direction of the image.

19. An indication member comprising:
a rod; and
a sphere at a distal end of the rod,
wherein an outer peripheral surface of the sphere and an outer peripheral surface of an end of the rod adjacent the sphere form a retroreflector, and
wherein a degree of retroreflection of the retroreflector increases from a distal end side toward a base end side of the sphere and the end of the rod.

20. The indication member according to claim 19,
wherein a degree of retroreflection of the retroreflector varies.

21. The indication member according to claim 19,
wherein a degree of retroreflection of the retroreflector is variable.

22. The indication member according to claim 19,
wherein a portion of the rod adjacent the end is a light absorber.

* * * * *